(12) United States Patent
Posset et al.

(10) Patent No.: US 10,268,096 B2
(45) Date of Patent: Apr. 23, 2019

(54) ELECTROCHROMIC ELEMENT WITH IMPROVED ELECTROLYTE LAYER

(71) Applicants: Fraunhofer-Gesellschaft zur Foerderung der angewandten Forschung e.V., Munich (DE); Bayerische Motoren Werke Aktiengesellschaft, Munich (DE)

(72) Inventors: Uwe Posset, Cadolzburg (DE); Christine Joost, Leonberg (DE); Marco Schott, Karlstadt (DE); Jurgen Clade, Eibelstadt (DE); Christine Muller, Ochsenfurt (DE); Matthias Beck, Munich (DE); Martin Pinsker, Bruckberg (DE); Tamas Gellert Bokor, Munich (DE); Robert Meszaros, Munich (DE)

(73) Assignees: Fraunhofer-Gesellschaft zur Foerderung der angewandten Forschung e.V., Munich (DE); Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/560,215

(22) PCT Filed: Mar. 21, 2016

(86) PCT No.: PCT/EP2016/056174
§ 371 (c)(1),
(2) Date: Sep. 21, 2017

(87) PCT Pub. No.: WO2016/150921
PCT Pub. Date: Sep. 29, 2016

(65) Prior Publication Data
US 2018/0088426 A1   Mar. 29, 2018

(30) Foreign Application Priority Data

Mar. 24, 2015   (DE) .................. 10 2015 104 439

(51) Int. Cl.
*G02F 1/153* (2006.01)
*C09K 9/02* (2006.01)
(Continued)

(52) U.S. Cl.
CPC ............ *G02F 1/153* (2013.01); *C08J 5/2243* (2013.01); *C09K 9/02* (2013.01); *G02F 1/15* (2013.01);
(Continued)

(58) Field of Classification Search
CPC .. G02F 1/153; G02F 1/155; C09K 9/02; C08J 5/2243
See application file for complete search history.

(56) References Cited

U.S. PATENT DOCUMENTS 4,615,748 A   10/1986   Takino et al.
5,327,281 A   7/1994   Cogan et al.
(Continued)

FOREIGN PATENT DOCUMENTS

EP   0499115 A1   8/1992
EP   2444839 A1   4/2012
(Continued)

OTHER PUBLICATIONS

Baetens et al., Properties, requirements and possibilities of smart windows for dynamic daylight and solar energy control in buildings: A state-of-the-art review, Solar Energy Materials & Solar Cells, vol. 94, p. 87-105, 2010, Norway.
(Continued)

*Primary Examiner* — Jack Dinh
(74) *Attorney, Agent, or Firm* — Duane Morris LLP

(57) ABSTRACT

The invention relates to an electrochromic element comprising two substrates having electrically conductive insides, a layered operating electrode which comprises a metal complex compound and which is capable of entering into a redox reaction where the transition from the oxidized to the reduced state is attended by an increase of color depth and
(Continued)

the transition from the reduced to the oxidized state is attended by a corresponding weakening of color, an electrolyte layer in the form of a transparent, flexible film, and a counterelectrode$_{[ATI(D1]}$ which is capable of intercalating mobile cations of the electrolyte material and/or of entering into a redox reaction in which when the material of the second electrode changes from the oxidized to the reduced state it exhibits no increase of color depth in the wavelength region of the increase of color depth of the metal complex compound and preferably is not subject to any increase of color depth at all, where the electrolyte layer comprises at least the following components: (a) a crosslinkable hybrid prepolymer, (b) a crosslinkable organic monomer or prepolymer, (c) a non-crosslinkable, thermoplastic organic polymer, and a dissociable salt whose inorganic cations can, in the presence of a charge difference between the operating electrode and the counterelectrode, move between the said electrodes. The electrochromic element is more particularly suitable as constituent of automobile glazing systems.

32 Claims, 8 Drawing Sheets

(51) Int. Cl.
C08J 5/22 (2006.01)
G02F 1/155 (2006.01)
G02F 1/15 (2019.01)
B60J 3/04 (2006.01)

(52) U.S. Cl.
CPC .............. G02F 1/155 (2013.01); B60J 3/04 (2013.01); C08J 2333/12 (2013.01); C08J 2351/00 (2013.01); C08J 2433/10 (2013.01); C08J 2451/00 (2013.01); C09K 2211/1007 (2013.01); C09K 2211/1074 (2013.01); C09K 2211/187 (2013.01); G02F 2001/1502 (2013.01); G02F 2001/1519 (2013.01); G02F 2001/1555 (2013.01)

(56) References Cited

U.S. PATENT DOCUMENTS

| | | | |
|---|---|---|---|
| 6,040,056 | A | 3/2000 | Anzaki et al. |
| 6,639,708 | B2 | 10/2003 | Elkadi et al. |
| 7,586,663 | B1 | 9/2009 | Radmard et al. |
| 7,923,530 | B2 | 4/2011 | Higuchi et al. |
| 8,378,062 | B2 | 2/2013 | Higuchi et al. |
| 2008/0239452 | A1 | 10/2008 | Xu et al. |
| 2009/0052006 | A1 | 2/2009 | Xu et al. |
| 2009/0270589 | A1 | 10/2009 | Higuchi et al. |
| 2012/0127554 | A1 | 5/2012 | Higuchi et al. |
| 2012/0307341 | A1 | 12/2012 | Higuchi et al. |
| 2013/0201550 | A1 | 8/2013 | Higuchi et al. |
| 2014/0009812 | A1 | 1/2014 | Higuchi et al. |
| 2014/0226201 | A1 | 8/2014 | Posset et al. |

FOREIGN PATENT DOCUMENTS

| | | |
|---|---|---|
| EP | 2851349 A1 | 3/2015 |
| JP | H0513365 B2 | 2/1993 |
| JP | H0562711 B2 | 9/1993 |
| JP | H0562712 B2 | 9/1993 |
| JP | 2007112769 A | 5/2007 |
| JP | 2007112957 A | 5/2007 |
| JP | 2008162967 A | 7/2008 |
| JP | 2008162976 A | 7/2008 |
| JP | 2008162979 A | 7/2008 |
| JP | 5092140 B2 | 12/2012 |
| WO | 2007049371 A1 | 5/2007 |
| WO | 2008081762 A1 | 7/2008 |
| WO | 2008143324 A1 | 11/2008 |
| WO | 2014121263 A1 | 8/2014 |

OTHER PUBLICATIONS

Da Silva et al., Electrochromic Properties of a Metallo-supramolecular Polymer Derived from Tetra(2-pyridyl-1,4-pyrazine) Ligands Integrated in Thin Multilayer Films, Langmuir, vol. 28, p. 3332-3337, Feb. 2012, Brazil.

Fernandes et al., Li+- and Eu3+-Doped Poly(ε-caprolactone)/Siloxane Biohybrid Electrolytes for Electrochromic Devices, Applied Materials and Interfaces, vol. 3, p. 2953-2965, 2011, Portugal.

Granqvist et al., Electrochromic coatings and devices: survey of some recent advances, Thin Solid Films, vol. 442, p. 201-211, 2003, Sweden.

Hajzeri et al., Sol-gel vanadium oxide thin films for a flexible electronically conductive polymeric substrate, Solar Energy Materials & Solar Cells, vol. 99, p. 62-72, 2012, Slovenia.

Higuchi et al., Electrochromic Solid-State Devices Using Organic-Metallic Hybrid Polymers, J Inorg Organomet Polym, vol. 19, p. 74-78, 2009, Japan.

Hossain et al., A Green Copper-Based Metallo-Supramolecular Polymer: Synthesis, Structure, and Electrochromic Properties, Chem. Asian J., vol. 8, p. 76-79, 2013, Japan.

Huang et al., Development and characterization of flexible electrochromic devices based on polyaniline and poly (3,4-ethylenedioxythiophene)-poly(styrene sulfonic acid), Electrochimica Acta, vol. 51, p. 5858-5863, 2006, Taiwan.

Ma et al., Flexible electrochromic device based on poly (3,4-(2,2-dimethylpropylenedioxy)thiophene), Electrochimica Acta, vol. 54, p. 598-605, 2008, United States.

Marcel et al., An all-plastic WO3 H2O / polyaniline electrochromic device, Solid State Ionics, vol. 143, p. 89-101, 2001, France.

Pawlicka, Development of Electrochromic Devices, Recent Patents on Nanotechnology, vol. 3, p. 177-181, 2009, Brazil.

Pozo-Gonzalo et al., All-plastic electrochromic devices based on PEDOT as switchable optical attenuator in the near IR, Solar Energy Materials & Solar Cells, vol. 92, p. 101-106, 2008, Spain.

Posthumus et al., Surface modification of oxidic nanoparticles using 3-methacryloxypropyltrimethoxysilane, Journal of Colloid and Interface Science, vol. 269, p. 109-116, 2004, The Netherlands.

Whittell et al., Functional soft materials from metallopolymers and metallosupramolecular polymers, Nature Materials, vol. 10, p. 176-188, Mar. 2011, United Kingdom.

Widjaja et al., Progress toward roll-to-roll processing of inorganic monolithic electrochromic devices on polymeric substrates, Solar Energy Materials & Solar Cells, vol. 92, p. 97-100, 2008, Belgium.

Zelazowska et al., Organic-inorganic hybrid electrolytes for thin film metal oxide electrochromic coatings, Optica Applicata, vol. XXXV, No. 4, p. 887-894, 2005, Poland.

Serial graph:

Serial graph:

Serial graph:

ELECTROCHROMIC ELEMENT WITH IMPROVED ELECTROLYTE LAYER

BACKGOUND OF THE INVENTION

The present invention relates to a flexible electrochromic element (electrochromic device, ECD) with an improved electrolyte layer, which can be produced in large sheets as needed, and which, because of its favorable mechanical and optical properties, is suitable for large window surfaces, for curved glazings, such as is required in the automotive industry, but also for any other glazings, and especially, but not exclusively, where electrical control of light transmission is desirable for reasons of energy efficiency, safety and/or heightened comfort and/or also where curved glass panes must be realized.

It would be highly advantageous if electrochromic elements could also be implemented in vehicle glazings; however, the technologies available to date are not sufficiently mature to be distributed beyond the small-scale. In the present invention "vehicles" are to be understood as meaning in particular motor vehicles (cars, trucks, buses), and motorcycles, in a broader sense also railed vehicles and watercraft and aircraft. Two main advantages speak for the use of electrochromic switchable elements in vehicle glazing:

1) Better control of the climate in the vehicle interior (individual design of the lighting conditions, reduction of the incident solar energy according to need, which leads to increased comfort and reduced cooling power demand).
2) Targeted shading of the vehicle interior from the outside view (privacy protection, anti-theft protection)

In order to best fulfill these two roles, the electrochromic element must meet many requirements. The light/dark transmission values and the contrast ratio (=light transmission: dark transmission) they define and the transmission range (=light transmission−dark transmission) are considered especially important, and in addition the visual impression in both states, as well as the switching speeds. For both for the climate control and for the visual shading function, high contrast values are desirable, which enhance the functions.

Low shifting times are important to make users aware of the switching process. Ideal ranges for this are less than 1 minute, preferably less than 30 seconds, or even less. These switching times strongly depend on the window size and the sheet resistance of the substrates, among other factors. Another important factor is starting the operation of the vehicle in the presence of complete shading—in this case, the windows in front (and to the side) of the driver(s)/operator(s)/pilot must brighten up first, so that the vehicle can be operated safely—a delay in the switching process and thus in driving off should be kept to a minimum.

An extremely important factor, especially for motor vehicles, is the visual transmission of the glazing in the bright state to the front and sides of the driver. In order for a glazing to be approved in the automotive sector, a visual light transmission of at least 70% must be achieved—in addition to a sufficiently low dark transmission—in accordance with DIN EN 410. If this condition is not met, the available surface and thus the effect of the electrochromic elements on the windows behind the B-pillar in the motor vehicle is reduced—a major reason why the previously known, electrochromic technologies have not achieved a breakthrough in the field of automotive glazings. They are unable to achieve an adequately perceptible transmission range, apart from the short shifting times that are required. In addition to all of these requirements, the electrochromic element must be integratable into common spatial structures of vehicle glazing (often with geometries bent about 2 axes) or into the processes for their production.

Technologies are already being employed in automobile glazing for the purpose of providing electrically switchable transparency. A widespread solution is the use of so-called suspended particle devices (SPD) from Research Frontiers. The advantages of this technology consist of the fast switching operation, the excellent contrast ratio, and an acceptable transmission range. However, there are also many disadvantages, such as low thermal stability and high control voltages (to achieve the bright state, the SPD element must carry 120 V voltage). The decisive factor, however, is that a visual transmission of at least 70% is not reached, which limits the possible application areas within the important automotive segment. SPD elements are used for glazing cabin windows of airplanes and luxury yachts as well as for roof systems of upper class vehicles.

Special LCD elements are also known with which the transparency of a glass surface can be changed. However, they essentially offer only the aforementioned main advantage (2) for vehicle glazings, as they do not become dark, but only opaque, in the non-transparent state i.e., they enhance the diffuse light scattering. The light- and thus the energy transmission of such elements is not significantly below those of conventional vehicle glazings.

An improved technical solution is therefore required that allows the application of electrochromic elements for use in and on vehicles, in particular motor vehicles. Moreover, improved electrochromic elements should also be suitable in the above respect for use in many other application areas in which the electrical control of the light transmission is desirable for reasons of energy efficiency, safety, or improved comfort. These include in particular intelligent architectural glazings and dimmable aircraft cabin windows, but also electrically switchable sunglasses and household appliances (e.g., dimmable refrigerator or oven doors) and the like.

Although research in the field of electrochromic materials and systems has been ongoing for over four decades, flexible ECDs have only moved into the focus over the past few years. This is mainly due to the fact that research and development was initially concerned with ceramic-like, brittle EC materials, and high-performance flexible conductive substrates have only recently become available.

An electrochromic element typically comprises a first conductive substrate coated with an optically active electrochromic material (this is hereinafter referred to as "operating electrode," abbreviated "OE"), a second conductive substrate coated with an ion storage material (this is hereinafter referred to as "counterelectrode," abbreviated "CE"), and an electrolyte layer positioned between these electrodes that connects then so as to be electrically insulating but ionically conductive (see FIG. 1). Ion-storing materials are known that change their color upon incorporation of the charge carriers and can thus act as electrochromic materials themselves. If the color change of such CE runs oppositely synchronous with the OE, it is referred to as complementary coloring.

Ideally, all components are present as solid films.

The conductive substrate may in principle consist of a non-conductive plastic or glass, which is coated with a thin film of electrically conductive material (e.g., applied via the sputtering method or physical or chemical vapor phase deposition). The plastics normally used for the substrate core material enable the production of flexible or curved ECDs. The conductive surface coatings may consist of a transparent conductive metal oxide (Transparent Conducting Oxide, TCO). For glass, the fluorine-doped tin oxide (FTO) is to be mentioned in particular, a material that could not yet be deposited directly onto plastic substrates because of the temperatures required for the manufacture. In addition to such inorganic semiconductor layers, organic polymer conductive materials can also be used, such as PEDOT [poly(3,4-ethylenedioxy)thiophene], a polymer with a low bandgap. Such polymers are usually deposited via wet-chemistry, e.g., via a roll-to-roll processing (R2R).

The electrolyte can principally be a liquid, a gel, a solid polymer, or a ceramic-like ("all-solid-state") material. Mixed forms are also known, for example, polymers filled with inorganic nanoparticles, or so-called "ormolytes," which are inorganic-organic hybrid polymers that are produced by hydrolysis and polycondensation. Polymer electrolytes are particularly interesting due to their low manufacturing costs and the possibility of designing leak proof and mechanically flexible EC-elements. Different compositions have been proposed here, where most are based on commercially available polymers, such as ethylene oxide polymers (PEO), poly(methyl methacrylate) (PMMA), poly(vinylidene fluoride) (PVDF), or cellulose. Although the work in the field of electrolytes has progressed over the past years, challenges regarding the electrochemical, thermal and UV stability are still being faced. In addition, the electrolyte must be adapted to the active layers used and must have excellent flexibility and processability in order for it to be used in flexible devices.

The active, i.e., color-producing material of the OE can be inorganic or organic in nature and consist of a ceramic- or polymer-like material. The most prominent examples are the cathodically-coloring tungsten (VI) oxide and cathodically-coloring PEDOT variants.

The active, i.e., ion-storing and possibly also coloring material of the CE may also be inorganic or organic in nature. Numerous ion-storing materials are known that are, in principle, suitable, e.g., mixed-valent nickel (II, III) oxide or hexacyanoferrate complexes such as Prussian blue (PB), but also some polymers, such as polycarbazoles. In contrast, materials such as cerium (IV) oxide and especially titanium mixed oxides ($TiCeO_x$, $TiVO_x$), which only have a low coloring efficiency, behave rather indifferently. Materials applied in Li-ion batteries, such as Li-titanate and Li-manganate, provide effective storage materials with low coloring efficiency, provided they can be visualized in the form of transparent thin films. Oxidic ion storage materials are usually physically deposited by the sputtering method or by wet-chemistry via the sol-gel method with subsequent thermal compression. In both cases, the substrates are exposed to high temperatures, which makes the application onto plastic films (and thus in flexible EC-elements) complicated, if not impossible. Hexacyanoferrates, which can be deposited galvanically at low temperature or from nanoparticle suspensions offer a solution. Further, certain oxides, such as vanadium(V)oxide can be visualized via wet chemistry at low temperature, see M. Hajzeri et al., Solar Energy Materials and Solar Cells 99 (2012), p. 62-72.

A. J. Widjaja et al. reported on a method for producing flexible EC elements in Solar Energy Materials & Solar Cells, 92 (2008) 97-100, where at least one component is manufactured via a R2R process. However, these authors report on the benefits of the R2R process in this context only in a general way. The only specified example is the deposition of $WO_3$. In WO 2013/041562 A1 U. Posset et al. disclosed a method for scalable production of a complete flexible EC-element via the R2R process on the basis of side chain-modified PEDOT derivatives with a high bright transmission and polymer electrolytes. Earlier, Granqvist et al. reported in Thin Solid Films 442 (2003) 201-21 1 on sputtered $WO_3$ and $NiO_x$-containing film elements, a technology that has been marketed for several years by the Swedish company Chromogenics AB under the name ConverLight™. Furthermore, there are a number of publications on developments that have not, however, moved beyond the laboratory scale, such as a hybrid $WO_3$-polyaniline system (see Marcel and Tarascon, Solid State Ionics 143, (2001) 89-101), a flexible film with polyaniline, and a poly(3,4-ethylenedioxythiophene)-poly(styrene sulfonic acid) copolymer as active materials (see L.-M. Huang et al., Electrochimica Acta 51 (2006) p. 5858-5863), and an "all-PEDOT" element, which was proposed by C. Pozo-Gonzalo et al. for the optical attenuation in the NIR region, see Sol. Energy Mater. Sol. Cells 92 (2008) 101-106. All of these systems demonstrate only low optical contrasts and low bright transmission. A flexible EC film element should also be mentioned, which is composed of the electrochromic polymer poly(3,4-(2,2-dimethylpropylene-dioxy) thiophene) ("PProDOT-Me$_2$") and a galvanically deposited $V_2O_5$—$TiO_2$ mixed oxide and was proposed for use in sunglasses, see C. Ma et al., Electrochimica Acta, 54, (2008) 598-605, US 2009/0052006 A1 and US 2008/0239452 A1. However, the system used in this liquid electrolyte, the lack of scalability, and the moderate bright transmission are obstacles for a technological implementation. All of these developments make use of the commercially available PET-ITO film with layer or sheet resistances of a minimum of 50 Ohm (the unit is also reported in Ohm per square, i.e., Ohm/sq).

The state-of-the-art technology available until 2009 or 2010 was described in detail by A. Pawlicka in Recent Patents on Nanotechnology 3, (2009) p. 177-1819 and by R. Baetens et al. in Sol. Energy Mater. Sol. Cells 94, (2010) 94-105. In the years since then, the inventors have not become aware of fundamentally new developments with regard to flexible EC-film elements.

The technologies corresponding to the aforementioned state-of-the-art technologies enable the production of flexible EC-elements with moderate to good performance. However, they do not meet the minimum requirements that apply for the integration into automotive glazings with respect to bright transmission, contrast, diffuse light scattering, safety, processability and switching speeds.

The so-called metallo-supramolecular polyelectrolytes (MEPE) are a promising new material type, which are transition metal-polypyridyl complexes that can be produced via metal ion-induced self-assembly in the form of linear chains. FIG. 2 depicts the formation of metallo-supramolecular polyelectrolytes (MEPE) (2) by self-assembly of metal (II) ions and bis-terpyridine ligands (1). For this purpose, multi-dentate chelating ligands such as terpyridine or tetra-2-pyridyl-1,4-pyrazine (TPPZ) are used as ligands, which are both chemically and thermally stable and have high binding constants, leading to the formation of macromolecular assemblages. Reference is made in this respect to the publication by C. A. da Silva et al., Langmuir 2012, 28, 3332-3337.

Metallopolymers as described above are increasingly gaining interest for use in electrochromic applications, as can, for example, be derived from the article by G. R. Whittell et al. in Nat. Mater. 2011, 10, 176-188. In this context, particular emphasis should be placed on the bipyridine complexes of the general formula $[M(bipy)_3]^{2+}$, with M=Fe (red), Ru (red-orange-light green), Os (green); bipy=2,2'-bipyridine, which display an intense metal ligand charge transfer (MLCT) band that disappears when the metal ion is oxidized to $M^{3+}$. Many metallopolymers exhibit polyelectrochromic properties that depend on the state of their charge.

Higuchi et al. reported on MEPE-based EC elements in J. Inorg. Organornet. Polym. Mater., 19 (2009) 74-78. This technology, however, can be implemented only on a laboratory scale and is not scalable.

The patent literature contains additional publications that describe MEPE-based materials and electrochromic elements based thereon. Reference is made in this regard to US 2014/009812 A1, 1 US 2013/201550 A1, EP 2618210 A1, U.S. Pat. No. 8,378,062 B2, EP 2535767 A1, US 2012/307341 A1, WO 2012/093547 A1; US 20127127554 A1; EP 2444839 A1; WO 2011/096386 A1; U.S. Pat. No. 7,923,530 B2; WO 20107147017 A1; US 20097270589 A1; WO 20087143324 A1; WO 20087081762 A1, WO 2007/049371 A1, JP 5013365 B2, JP 5013366 B2, JP 506 2711 B2, JP 5062712 B2, JP 5092140 B2, JP 2007-112769 A, JP2007-12957 A, JP2008-162967 A, JP 2008-162976 A and JP 2008-162979 A. The clear disadvantage arising from all of these documents is that a charge-storing counterelectrode (such as, e.g., metal oxides or metal hexacyanometallate) is not used, and merely the ITO layer used as the primary current conductor ("transparent electrode") serves this purpose. This type of structure is demonstrably not cyclically stable since under the present conditions such ITO films cannot reversibly store charge. "Gel" electrolytes consisting of a liquid electrolyte ($LiClO_4$ in acetonitrile (toxic) or propylene carbonate) that are merely thickened are also unsuitable for many applications.

Anodically coloring MEPEs also exist. For example, such MEPEs are described by Hossain, Sato and Higuchi in Chem. Asian J. 2013, 8, 76-79.

SUMMARY OF THE INVENTION

The object of the present invention is to provide a preferably flexible or partially flexible electrochromic element having improved mechanical properties. It is preferably suitable for integration into glazings and meets essential automotive requirements, such as desirable short switching times as specified above, high bright transmission (preferably at least 70% in accordance with DIN E 410) and a sufficient transmission range to ensure protection from view. The latter should preferably have a value of at least 50%, more preferably of at least 60%, and ideally 70% or even higher. The aspect of integrating the cell into a glazing is thereby important. In addition to incorporating a film cell by lamination, it enables hybrid constructions, such as the lining of half-cells with different base materials; therefore, the object is also to provide method steps that lead to the generation of corresponding electrochromically effective laminated glass.

BRIEF DESCRIPTON OF THE DRAWINGS

Figure 3:
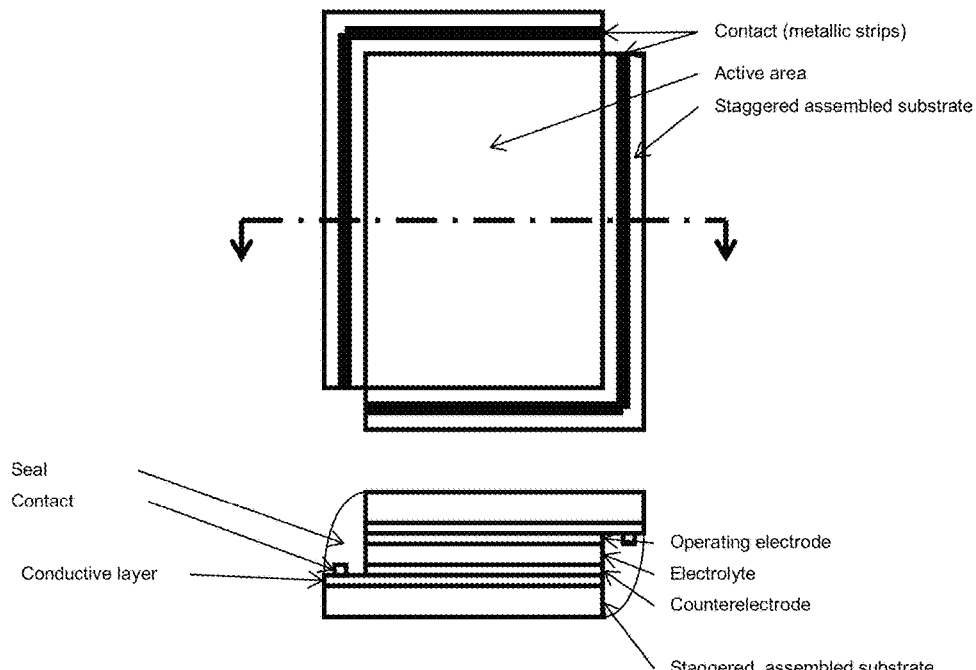

FIG. 3 demonstrates the contact of the two electrodes via electrically highly conductive, opaque or transparent conductor tracks (e.g.. metal strips) on the uncoated edges of the electrochromic element.

Figure 4:
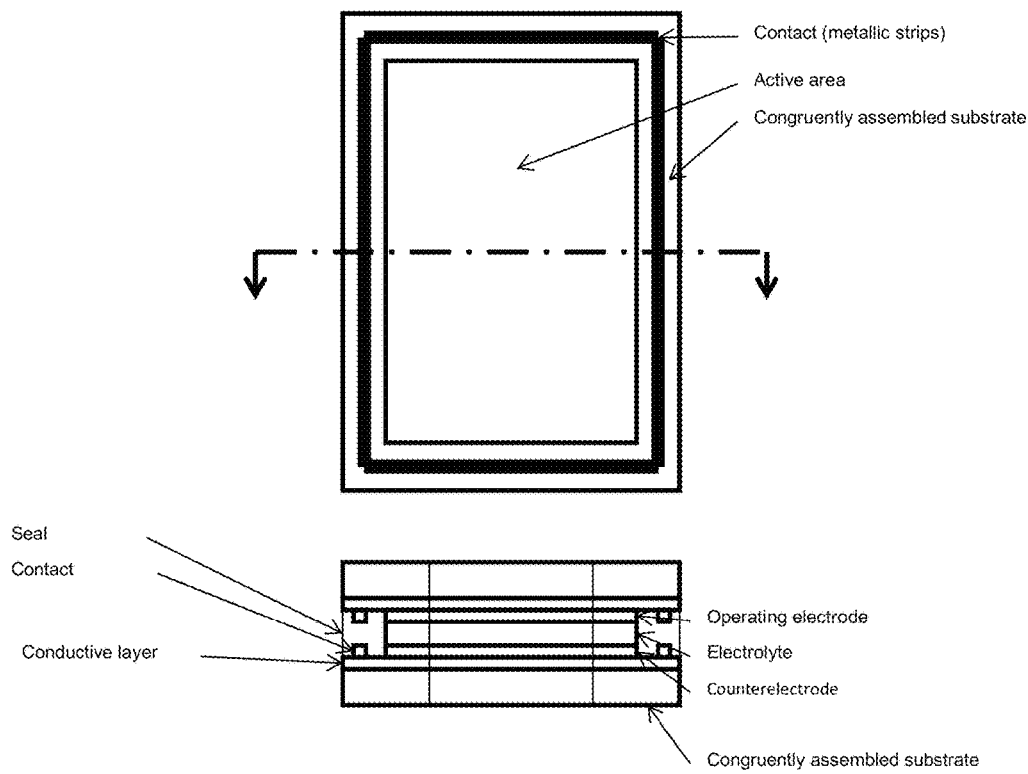

FIG. 4 shows a second possibility for contacting, through which even shorter response times can be achieved, is to have all-round contact on both sides.

FIGS. 5A and 5B show SEM images of a HP/Fe-MEPE-L1 (3:1) electrode obtained via dip coating.

Figure 6:
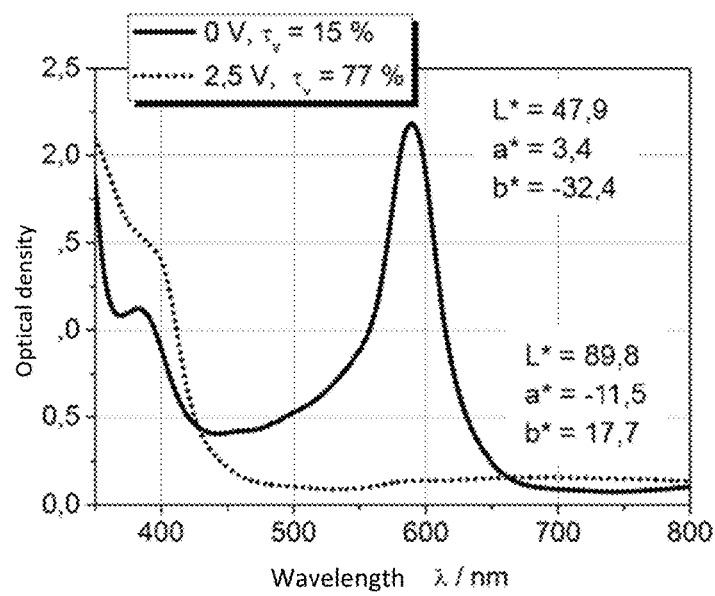

FIG 6 shows an in situ spectroelectrochemical half-cell measurement of the electrochromic properties of the HP/Fe-MEPE L1 layer from Example 2c.

Figure 7:
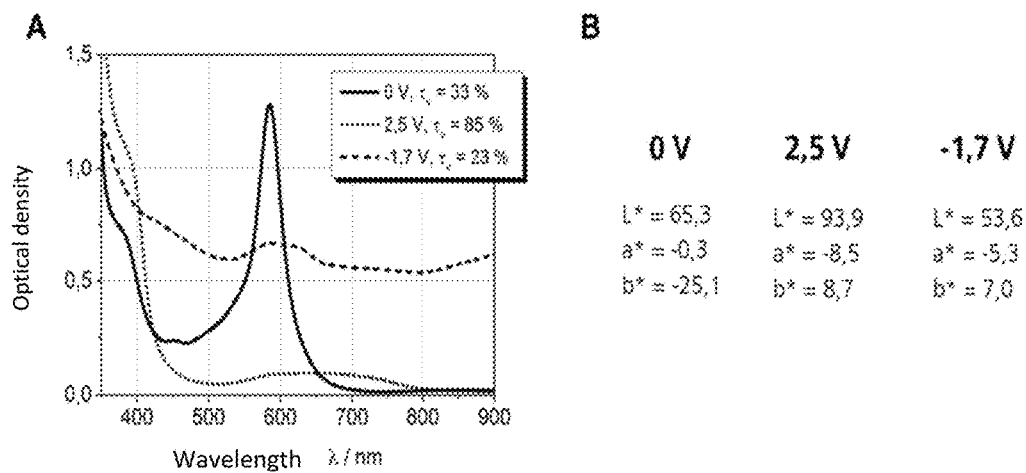

FIG. 7 shows an in situ spectroelectrochemical measurement (A) and L*a*b* values (B) of the electrochromic properties of the HP/Fe-MEPE L1 layer (ratio 3:1) from Example 2d.

FIGS. 8A and 8B show SEM images of a HP/Fe-MEPE-LO (3:1) electrode obtained via dip coating.

Figure 9:
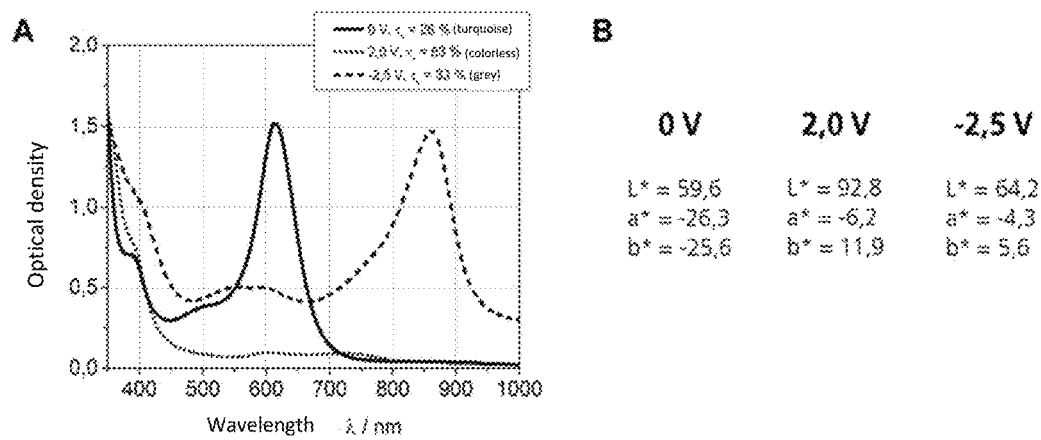

FIG. 9 shows an in situ spectroelectrochemical measurement (A) and L*a*b* values (B) of the electrochromic properties of the HP/ Fe-MEPE-LO-layer from Example 2f.

Figure 10:
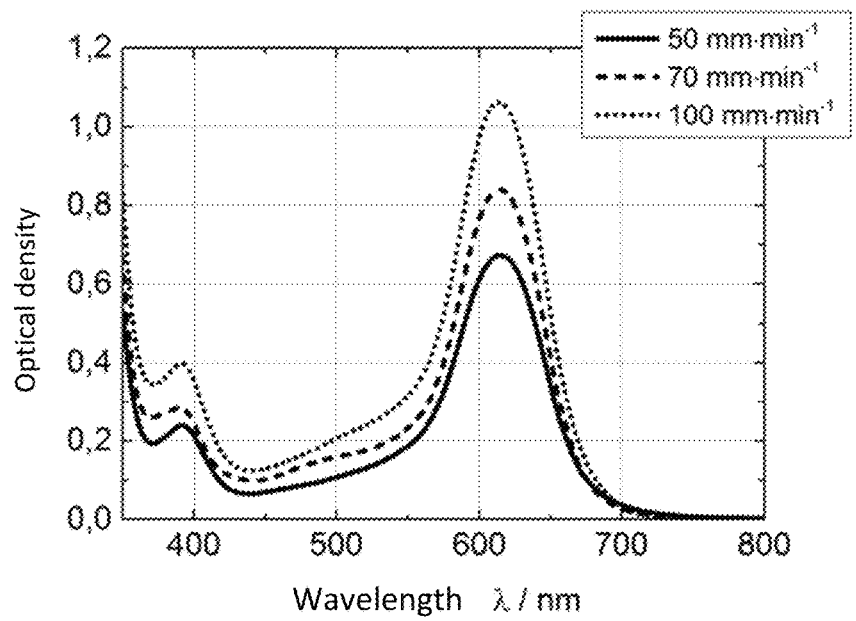

FIG. 10 shows the absorption spectra of an HP/Fe-MEPE L0/L1 (1:1) electrode obtained in this manner with different layer thicknesses on FTO glass.

Figure 11:
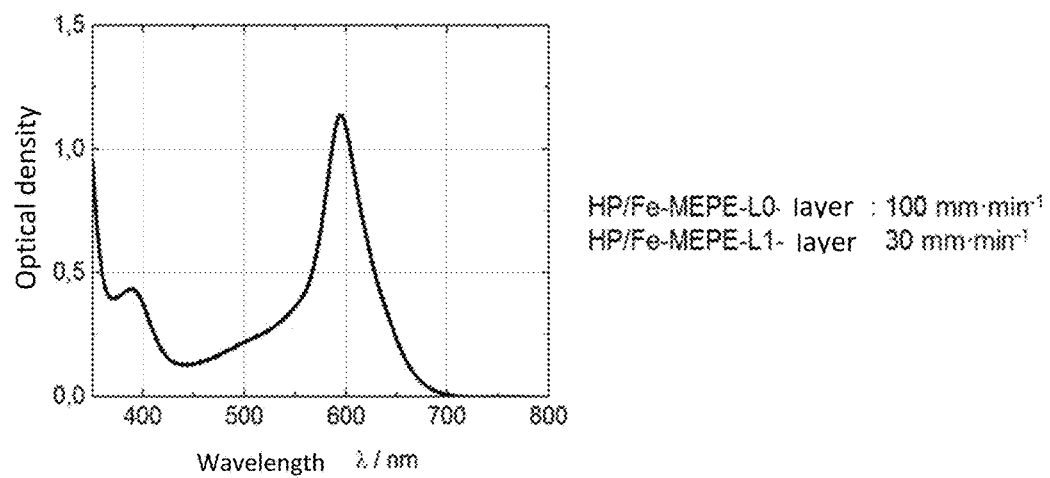

FIG 11. shows an absorption spectrum of an HP/Fe-MEPE-LO electrode, which was coated with a HP/Fe-MEPE-L1 layer.

Figure 12:
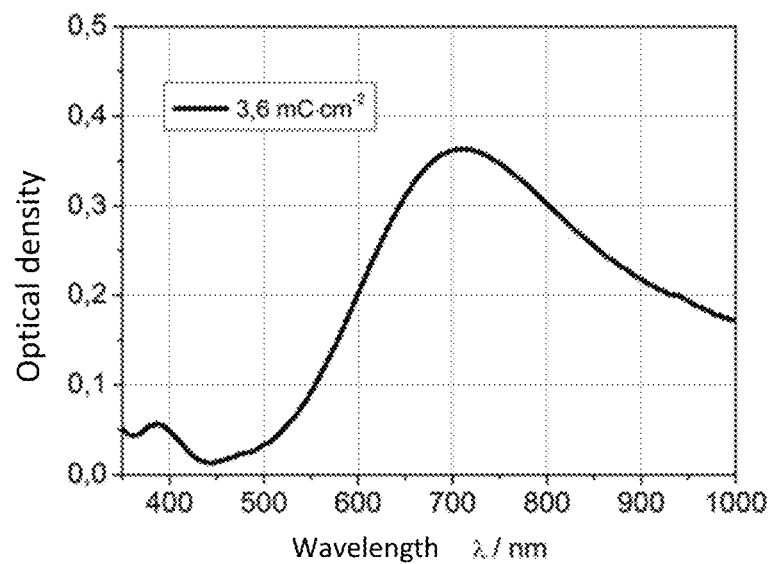

FIG 12. shows an absorption spectrum of such a PB-layer with a separation capacity of 3.6 mC $cm^2$ on FTO glass.

Figure 13:
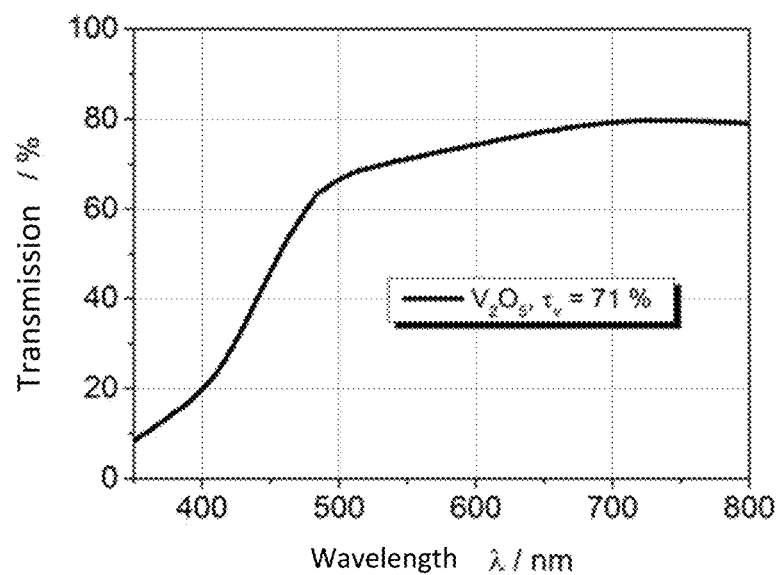

FIG. 13 shows a transmission spectrum of the layer with a visual transmittance $_Tv=71\%$.

Figure 14:
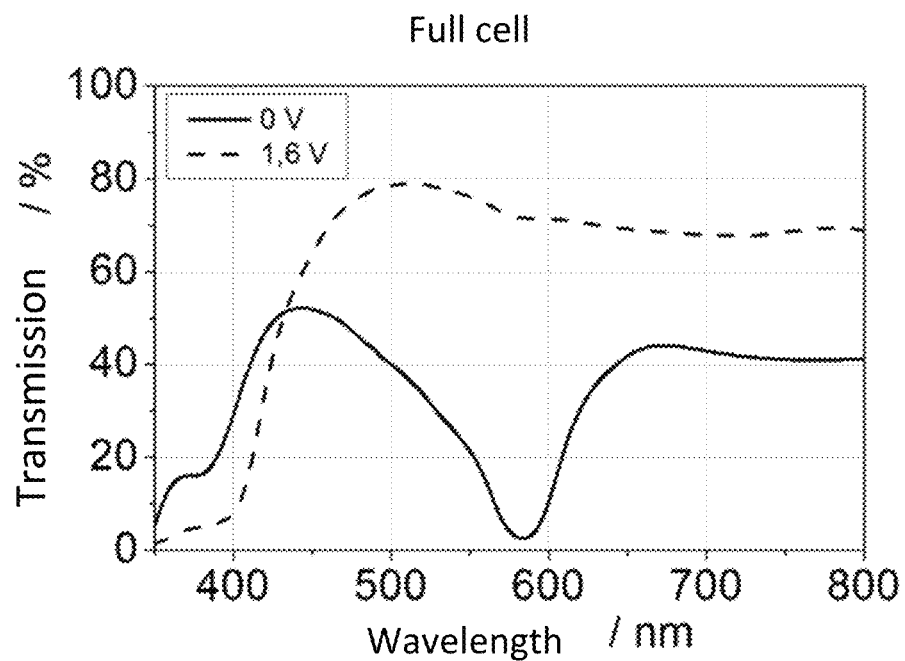

FIG. 14 depicts the characteristic transmission spectrum in the UV/Vis spectrometer of a cell produced according to Example 4a.

Figure 15:
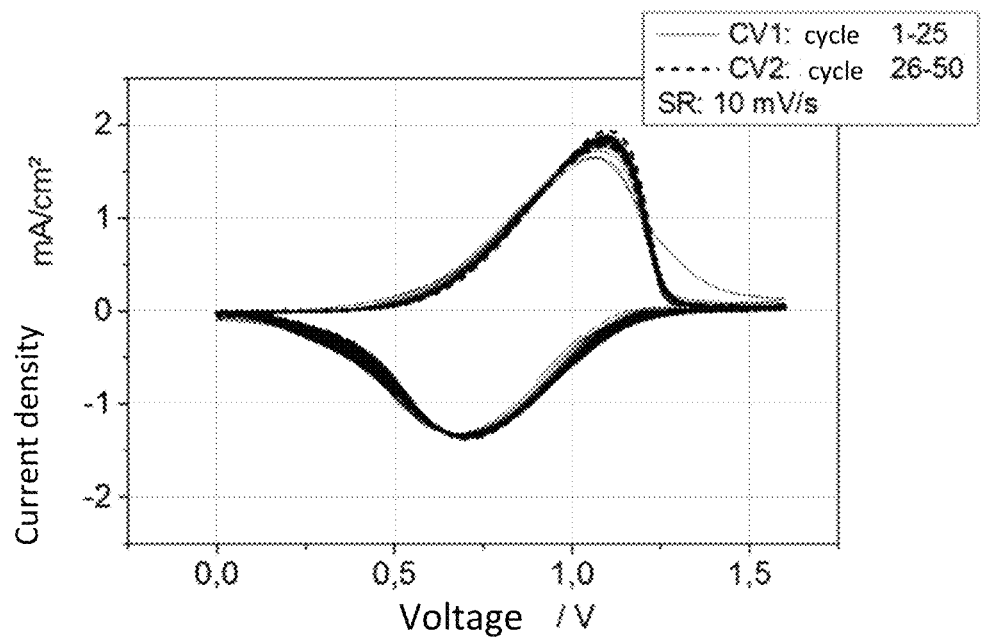

FIG. 15 shows the characteristic cyclic voltammogram (CV) of a full cell prepared according to Example 4a.

Figure 16:
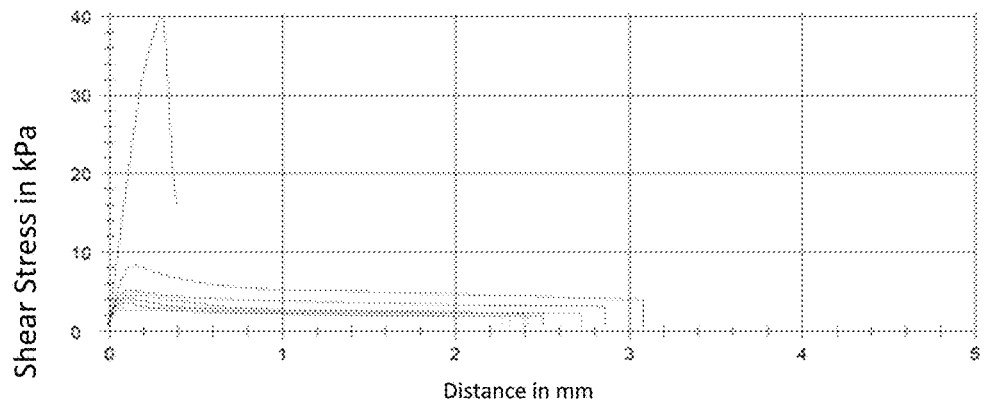
Figure 16:
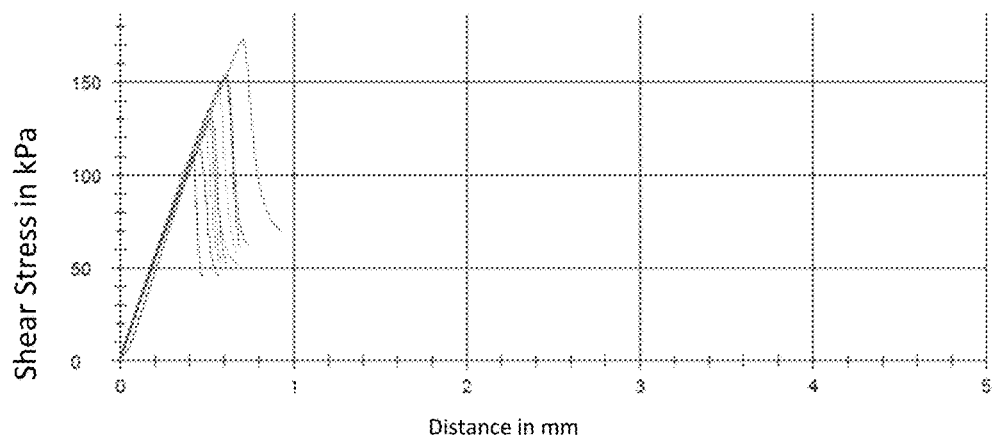
Figure 16:
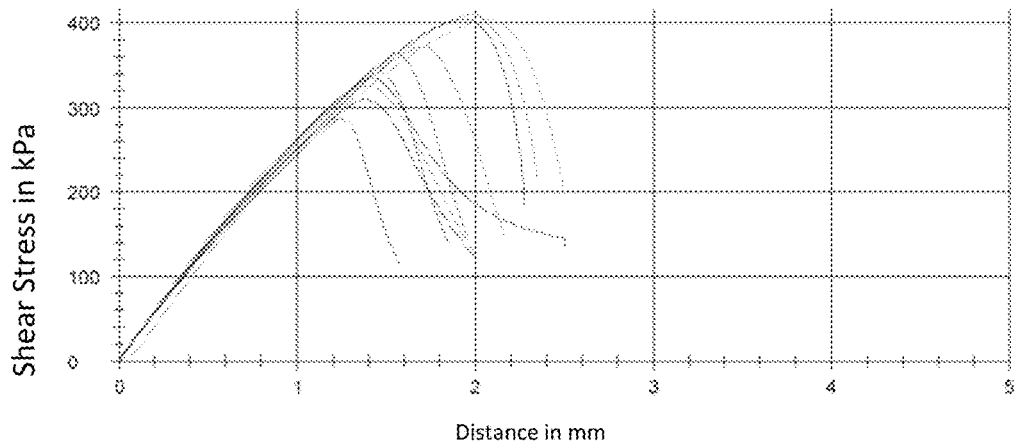

FIG. 16 depicts the results of all three electrolyte materials crosslinked in the presence of light, in which the values for the electrolyte 1 are presented at the top and the values for electrolytes 2 and 3 in the middle, and bottom.

DETAILED DESCRIPTIGN OF THE INVENTION

As the skilled person easily recognizes from the general and specific embodiments, the terms "glazings," "panels," "substrate" and the like according to the invention are by no means limited to elements that consist of panels of glass, but comprise elements with translucent, flexible or rigid panels made of any material, in particular of plastics and composite materials/laminated glass.

The object of the invention is solved by providing an electrochromic element, which can also be referred to as "electrochromical cell" with the following components:
  a first and a second, preferably planar substrate, which are each transparent for visible light and each have an electrically conductive surface on their inwardly facing sides,
  a layered operating electrode that is in contact with the electrically conductive surface of a first of the two substrates and has a metal complex compound which is capable of entering into a redox reaction, where the transition from the oxidized to the reduced state is attended by an increase of color, and the transition from the reduced to the oxidized state is attended by a corresponding weakening of color ("cathodically coloring" metal complex compound),
  an electrolyte layer which is located between the operating electrode and the counterelectrode and contains movable metal cations, and as a rule movable anions, a counterelectrode located between the electrolyte material and the conductive coating of the second substrate which is capable of intercalating mobile cations of the electrolyte material and/or of entering into a redox reaction in which, when the material of the second electrode changes from the oxidized to the reduced state, it exhibits no increase of color depth in the wavelength region of the increase of color depth of the metal complex compound and is preferably not subject to any increase of color depth at all, but may be "anodically coloring," i.e., subject to an increase of color depth during the transition from the reduced to the oxidized state.

wherein the electrolyte layer is a transparent, flexible film and comprises at least the following components:
(a) a crosslinkable hybrid prepolymer
(b) a crosslinkable organic monomer or prepolymer, also referred to as reactive diluent,
(c) a non-crosslinkable organic polymer and
(d) a dissociable salt whose inorganic cations can, in the presence of a charge difference between the operating electrode and the counterelectrode, move between said electrodes.

The layer may optionally further comprise the following components:
(e) a solvent or a solvent mixture and/or
(f) a nanoparticle preparation.

The polymer electrolyte material is synthesized by mixing the aforementioned components and subsequently crosslinking the prepolymers, wherein the components (a), (b) and (c) are present in liquid or paste form.

The term "color deepening" is used according to the invention to denote an increase in the intensity of color (increase of color depth), but not a color shift to longer wavelengths (bathochromism). The term "color deepening" together with the term "decrease of color" therefore forms a pair of terms$_{[ATI(D2)]}$.

The crosslinkable hybrid prepolymer (a) generally contains an inorganic network comprising or consisting of (semi)metal-oxygen (semi) metal bonds (Si—O—Si bonds and/or Si—O-metal bonds and/or metal-O-metal bonds) and organic components and is preferably an inorganic-organic hybrid polymer ("ORMOCER®") which comprises inorganic condensated Si—O—Si bonds and is thus to be regarded as or referred to as an organo(hetero)polysiloxane or organically modified silicic acid(hetero)polycondensate. A hybrid polymer, which has additional metal cations M such as Al, Zr, Ti or Ta incorporated into the inorganic network, is referred to as organoheteropolysiloxan or organically modified silicic acid heteropolycondensate, and a hybrid polymer without such metal cations as polysiloxane/silicic acid polycondensate. The silicon atoms of this network typically carry organic groups that are incorporated into the network via Si—C bonds and therefore remain bound to the silicon during the condensation reaction that forms the network for which silanes are used as starting material. The term "inorganic-organic hybrid polymers" also includes so-called oligosilsesquioxanes and cubic oligomeric silsesquioxanes (POSS).

To produce the hybrid polymers, suitably modified silanes or silane-containing starting materials with hydrolytically condensable residues such as alkoxy groups or halogens or hydroxy groups are typically used, which are converted into an inorganic network via polycondensation. This expert is familiar with this from various publications. For this purpose the known sol-gel is used in an advantageous, but not necessary, manner. If the, or some, of the organic groups bonded to silicon atoms by carbon are organically crosslinkable, i.e, for example carry an organic polymerizable C=C double bond (example: methacrylic groups, acrylic groups, in particular the corresponding (meth-) acrylate groups norbornene groups) or a group polymerizable under ring opening (example: epoxide ring), a corresponding organic crosslinking is optionally performed in a second step, with the formation of an organic network or of organic groups bridging two or more silicon atoms. Such an organic crosslinking can be performed prior to applying the electrolyte layer, but is usually performed afterwards. This results in the special and preferred characteristic: the organic and the inorganic components are bound to each other via covalent Si—C bonds, and the organic components can be optionally linked or have been linked e.g., via UV or thermal organic crosslinking reactions, such as polymerization of C=C double bonds under formation of carbon chains or an epoxide polymerization. Said hybrid polymer component (a) serves primarily to improve the adhesion properties and UV stability of the electrolyte layer. It also helps to minimize possible shrinkage resulting from crosslinking and can be used to adjust the refractive index.

The crosslinkable organic monomer or prepolymer (b), which is also referred to as a reactive diluent, is capable of undergoing a polymerization reaction. For this purpose, it has at least two organically polymerizable groups per molecule, for example, UV or thermally crosslinkable groups. Particularly preferred are groups which contain C=C double bonds, such as vinyl, acrylate, methacrylate, or epoxy groups. Preferably, the monomer or prepolymer (b) comprises one or more linear or branched polyether segments. More preferably, these polyether segments contain monomeric units —O—CH$_2$CHR—, where R=H or alkyl with preferably 1 to 6 carbon atoms, in particular H or CH$_3$. In particularly preferred embodiments, the organically polymerizable groups are selected such that they can copolymerize with organically crosslinkable groups of the crosslinkable hybrid prepolymer (a). In these cases, the crosslinkable organic monomer or prepolymer (b) can have the same organically crosslinkable groups as the hybrid polymer (a) used, for example, at least two acrylate or methacrylate groups per molecule. Alternatively, polymerization in the form of a polyaddition reaction, such as a thiol-ene addition or a polycondensation reaction is possible. In these cases, the crosslinkable organic monomer or prepolymer (b) can have, for example, at least two thiol groups. The monomer or prepolymer (b) is useful for the processing of the electrolyte and serves to achieve a degree of flexibility.

The non-crosslinkable organic polymer (c) has the properties of a thermoplastic. In principle, it can be of any composition. Preferably, the polymer is selected from the group of polyacrylates, acrylate ester polymers or polyether, or it is, or contains, a copolymer that contains (poly)acrylate, an acrylate ester polymer and/or a polyether. Poly(methyl methacrylates), ethyl methacrylate-methyl acrylate copolymers, and poly(propylene oxide-ethylene oxide) copolymers are mentioned purely by way of example. According to the invention, a polymer is preferred that does not crystallize or appreciably softens in the thermal range of application (ranging from about −25° C. to 80° C.), but demonstrates thermoplastic softening at temperatures and pressures that occur during autoclaving processes (about 120-150° C. or 10-18 bar). In this way, it can be ensured that during the application sufficient mechanical stability is maintained, and that during the manufacturing or processing of the electrochromic element to form an object, such as a window glass, well-defined interfaces (and thus good interlayer adhesion and low interfacial resistances) are obtained.

The dissociable salt (d) whose inorganic cations can, in the presence of a charge difference between the operating electrode and the counterelectrode, move between these electrodes is preferably an alkali metal salt or a tetraalkylammonium—especially in the case that the counterelectrode is capable of incorporating alkali ions. The salt has the general formula MX, where M represents a monovalent cation such as Li, Na, K, tetraalkyl, in particular tetrabutylammonium and X is an anion, which easily disassociates in the area around the electrolyte material (the components (a) to (c) and optionally (e)) and is generally also mobile in this area. The expert is familiar with such anions; they comprise in particular but not exclusively, $ClO_4^-$, $BF_4^-$, $PF_6^-$, $CH_3-COO^-$, $CF_3SO_3^-$ ("triflate"), $CH_3-C_6H_4-SO^-$ ("tosylate"), bis (oxalato)borate ($BOB^-$), bis(trifluoromethylsulfonyl)imide ($TFSI^-$), (fluoromethylsulfonyl)iimide ($FSI^-$). The salt is used in particular for the necessary charge transport.

The dissociable salt (d) is usually dissolved in a solvent or solvent mixture (e). This often, but not necessarily, contains a high-boiling component or consists of a high-boiling solvent. The term "high-boiling" is understood to mean that the component of the solvent mixture or the solvent does not boil below 130° C., preferably not below 160° C. and most preferably not below 200° C. The solvent can have advantages other than its role of enabling the dissolution of the dissociable salt (d). Thus, in many cases it can improve the wetting properties and increase the ionic conductivity of the electrolyte resin. If it, or a component thereof, is high-boiling, it acts in particular as a plasticizer. High-boiling solvents or high-boiling components of the solvent mixture are preferably selected from organic carbonates, so-called "ionic liquids," pyrrolidones, lactones, sulfolanes and polyethers and mixtures of two or more of these substances among themselves. A solvent mixture can also be used having a smaller or larger proportion of a high-boiling component. Its proportion can be e.g., at least 10 wt.-%, preferably at least 20 wt.-%, and often at least 50 wt.-%. Examples of organic carbonates are ethylene carbonate, propylene carbonate, vinyl carbonate, methylethyl carbonate, dibutyl carbonate. Preferable are propylene carbonate and dibutyl carbonate. Examples of ionic liquids are BMI-TFSI (1-butyl-3-methylimidazolium-bis (trifluoromethylsulfonyl)imide) and NMP TFSI (N-methyl-pyrrolidinium-bis (trifluoromethylsulfonyl)imide). Examples of solvents that are not high-boiling within the meaning of the invention are alcohols, in particular methanol and ethanol, ethers, ketones such as acetone and the like. Suitable solvents are those, for example, that are used for the preparation of nanoparticles (f) or—optionally—for the preparation of the crosslinkable hybrid polymer (a).

The presence of solvent is not absolutely necessary; if the components (a) to (c) of the electrolyte material are ion-conducting themselves when in the crosslinked state, they may also be omitted. In such cases, the salt is either dissolved in a non-high-boiling solvent according to the invention, which is removed again over the course of the further processing of the components, for example during a thermal crosslinking step, or no solvent at all is added to the mixture of the components for the polymer electrolyte. In such cases, however, solvent can still be present in the mixture, for example as component of the hybrid polymer (a) or of the nanoparticle preparation (f). This solvent or solvent mixture can also assume the task of the solvent or the solvent mixture according to (e); a separate addition thereof may then not be required. In some cases where the presence of non-high-boiling solvent is not desired, this solvent may be also removed again during processing.

In preferred embodiments of the invention the electrolyte layer contains only a very low proportion of high-boiling solvents, for example not more than 5 wt.-%, preferably not more than 3 wt.-% and particularly preferably not more than 1.5 wt.-%, relative to the total electrolyte layer material, and essentially no high-boiling non-solvent. "Essentially" is understood to mean that possibly present non-high-boiling solvent has been removed from the mixture as much as possible by conventional methods such as evaporation and/or suctioning off under vacuum.

Optionally, nanoparticles can be added to the employed electrolyte mixture according to the invention, where these are preferably selected so that the transmittance degree of the mixture does not change significantly in the visible range. The particles may have a surface modification for steric or electrostatic stabilization. Thus, they can be covalently bound to the polymer electrolyte via functionalization. This is achieved for example by functionalizing the surface of the nanoparticle with silanes that have the same groups bonded to silicon by carbon as the crosslinkable prepolymer hybrid, or its groups are capable of copolymerizing with such groups bound to the prepolymer. Corresponding functionalization techniques are known to the skilled person. The nanoparticle preparation primarily improves the mechanical properties by reducing the crosslinking-induced shrinkage. It consists of nanoparticles composed of metal oxides, mixed metal oxides, or from mixtures of metal (mixed) oxides dispersed in a suspending agent. Examples, which are not to be considered restrictive, are $SiO_2$, $TiO_2$, $Al_2O_3$, $ZnO$, $ZrO_2$, and $Ta_2O_5$, and mixtures thereof. The addition of nanoparticles increases the density of the electrolyte, generally causing it be become more viscous, harder or more form stable and it shrinks less during drying/crosslinking. Some oxides such as $TiO_2$ or $ZnO$ are effective UV absorbers, so that they can have a positive effect on the UV resistance of the electrolyte material. The primary particle size of the particles in the suspension should advantageously be in the range below 100 nm, preferably below 20 nm, in order to avoid the occurrence of diffuse light scattering.

The suspending agent can be volatile and thus removable after addition of the preparation to the electrolyte resin. Examples of such suspending agents are primary alcohols such as alcohols with a chain length of 1 to 6 carbon atoms. Alternatively, it has a somewhat high or high boiling point. In the latter case, as it at least partly remains in the electrolyte composition, it should be electrochemically stable and can therefore be selected from the group of substances listed above as a high-boiling solvents (d). Examples are organic carbonates. Furthermore, higher-boiling alcohols (e.g., with 7 to 11 carbon atoms) may be used. Both commercially available suspensions and those prepared specifically for the electrolyte mixture may be employed according to the invention.

By providing the electrolyte mixture described in more detail above, the inventors have succeeded in providing a material with a new and unique property profile. The technical efficiency of the individual components, which were thereby used is explained in detail in Table 1 below. It follows that a number of mechanical properties of the electrochromic element are positively affected by the use of the electrolyte according to the invention.

TABLE 1

Electrolyte components and their effect on the properties of the overall system.

| Component | Purpose/effect |
|---|---|
| Hybrid polymer (a) | Adhesion, UV stability |
| Reactive diluent (b) | Proccessability, elasticity |
| Organic polymer (c) | Stickiness, mechanical stability |
| Conducting salt (d) | Charge transport |
| Solvent (e) | Plasticizer, conductivity |
| Nanoparticle (f) | Minimize shrinkage, UV stability |

The electrolyte layer is applied with a thickness that delivers a film with a thickness of 1 to 200 µm, preferably from 20 to 100 µm.

An inventive electrolyte material that is particularly suitable for a flexible electrochromic film element preferably has the following composition (in % by weight):

| | |
|---|---|
| Hybrid polymer (a) | 1-50 |
| Reactive diluent (b) | 1-80 |
| Organic polymer (c) | 1-80 |
| Solvent or solvent mixture (d) | 0-80 |
| of which is high-boiling: | 0-80 |
| Conducting salt (e) | 1-20 |
| Nanoparticle preparation (f) | 0-20 |

More preferably, the electrolyte material has the following composition (in % by weight):

| | |
|---|---|
| Hybrid polymer (a) | 5-15 |
| Reactive diluent (b) | 10-25 |
| Organic polymer (c) | 5-40 |
| Solvent or solvent mixture (d) | 1-50 |
| of which is high boiling: | 1-50 |
| Conducting salt (e) | 5-15 |
| Nanoparticle preparation (f) | 0-10 |

In the course of the invention, it was found to be favorable that the layered operating electrode that can be used according to the invention is one which is in contact with the conductive coating of one of the two substrates and has a metal complex compound capable of entering into a redox reaction, where the transition from the oxidized to the reduced state is attended by an increase of color depth, and the transition from the reduced to the oxidized state is attended by a corresponding weakening of color. These electrochromic properties can be achieved through the use of suitable complex compounds with various transition metal ions. Conveniently, these are compounds with a chelating complex ligand that can bind the metal atoms e.g., via two or more nitrogen, oxygen or sulfur atoms. Particularly preferred is the use of ligands containing two or preferably three bondable nitrogen atoms with an available electron pair, for example, when incorporated into corresponding aromatic heterorings such as pyridine, pyrimidine, indolizine, imidazole, pyrazole, oxazole, isoxazole, thiazole or isothiazole and their benzocondensates such as benzimidazole or benzoxazole. These can be arbitrarily combined, for example, to the ligand bis-(benzimidazolyl)pyridine, bis(benzoxazolyl)pyridine, in which the pyridine residue is either unsubstituted or may be arbitrarily substituted, e.g., with OH or halogen, or to a terpyridine optionally substituted with, for example, a halogen (e.g., bromide), alkyl, alkoxy (in particular methoxy), hydroxy, nitro or aminophenyl. The variability of these ligands allows to obtain a wide range of colors. The principally complexable metal cations are generally transition metal cations; they are advantageously chosen in the present invention with respect to their redox potential, as shown in more detail below.

Examples of metal complexes with the chelating ligand bis(benzimidazol-2-yl)pyridine residue are Fe(2,6-bis(benzimidazol-2-yl)pyridine)$_2$ (BBIP (X=H)) and Fe-(2,6-bis(benzimidazol-2-yl)-4-hydroxypyridine)$_2$ (BBIP (X=OH)), examples of metal complexes with terpyridyl ligands are Fe(4'-chloro-2,2': 6',2''-terpyridine)$_2$ and Fe-(4'-(4-aminophenyl)-2,2': 6', 2''-terpyridine)$_2$.

Figure 1:
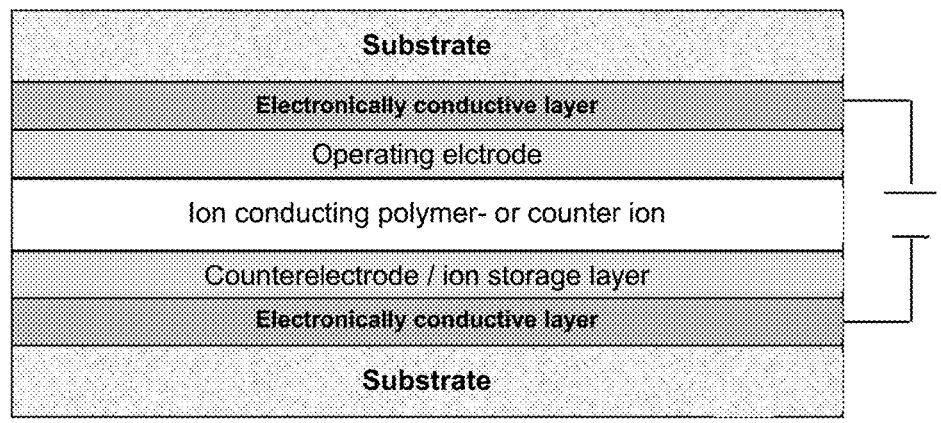
FIG. 1 is a schematic depiction of an electrochromic element in accordance with the present invention.
Figure 2:
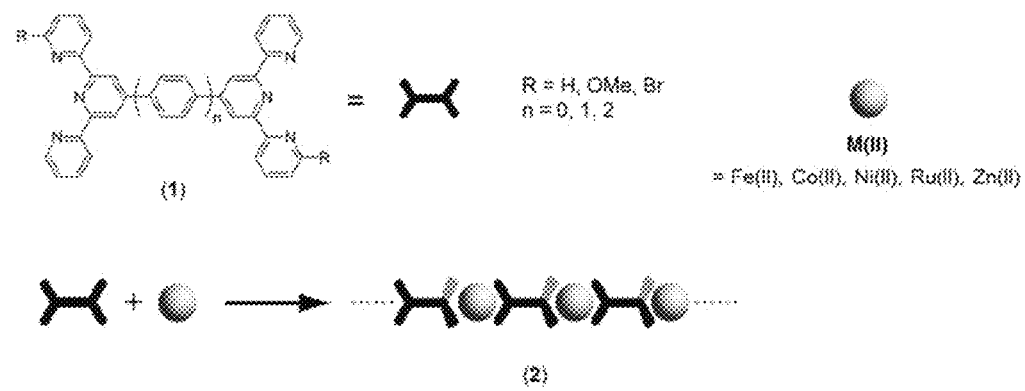
FIG. 2 depicts the formation of metallo-supramolecular polyelectrolytes (MEPE) (2) by self-assembly of metal (II) ions and bis-terpyridine ligands (1).

In a specific embodiment, the complex ligand may comprise two terpyridyl groups, which are connected to one another via a single bond or a spacer. The advantage of these ligands is that they are capable of complexing metal atoms on both sides, whereby the metal atoms can in turn be surrounded by two terpyridyl groups, so that a kind of chain polymer forms. Such terpyridine ligands are known from the literature (see, e.g., US 2009/0270589, EP 2444839 A1 or WO 2008/143324 A1); they can undergo polymer-like coordination compounds with the above-mentioned metal ions, particularly with Fe, Co, Ni, Zn or Ru, as seen with the terpyridine complex shown in FIG. 2.

Examples are shown in Table 2 below.

| MEPE | Ligand | Metal ion |
|---|---|---|
| Fe-MEPE-L0 (see Examples) | 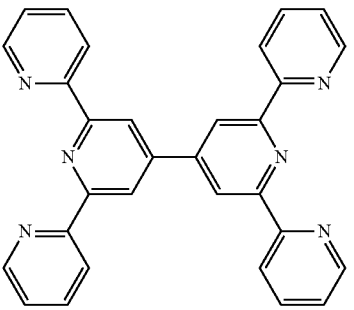<br>tpy-tpy | Fe(II) |

| MEPE | Ligand | Metal ion |
|---|---|---|
| Fe-MEPE-L1 (see Examples) | 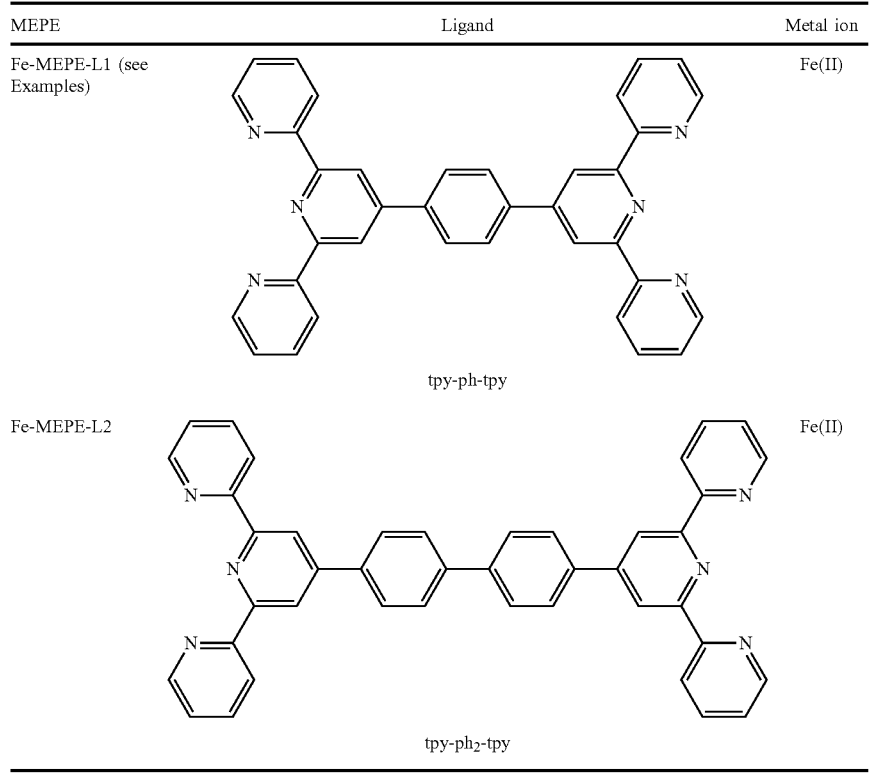  tpy-ph-tpy | Fe(II) |
| Fe-MEPE-L2 | tpy-ph$_2$-tpy | Fe(II) |

The named complexes fall within the aforementioned definition of MEPEs. The MEPEs are soluble in aqueous and alcoholic media and are air- and hydrolysis stable. By appropriate selection of ligands and metal ions, their optical and electrochemical properties can be varied.

In the present invention, it has now surprisingly been found that some of such MEPE thin films are distinguished by the combination of high mechanical flexibility, high coloring efficiency, short switching times and high visual transmission in the bright state, predestinating them in particular for use in electrochromic automotive glazings. Moreover, it has been found that MEPE can be processed at low temperature, so that the use of organic base materials (foil or plastic sheets) in particular is possible. In addition, it was shown that the breadth of the absorption band, and therefore the transmission range, can be increased when multiple MEPEs with complementary absorption characteristics are either mixed in a layer or applied as two separate layers. Although Higuchi et al. have already reported on MEPE-based EC-elements in 2009 [M. Higuchi et al., J. Inorg. Organornet. Polym. Mater., 19 (2009) 74-78], they neglect the requirement of employing an ion storage layer, which is mandatory for achieving high number of cycles. This technology is further only implementable on a laboratory scale and not scalable.

The coloring efficiency, i.e., the difference between the absorption in the reduced and the absorption in the oxidized state of the respective material as a function of the charge required for the color change is a quantitative measure of the electrochemically induced color. It is defined by the ratio of the logarithm of the change in optical density to the required charge. It is given for a specific wavelength and can be represented by the following formula (1), $$E = \frac{\log\left(\frac{\tau_{ch}}{\tau_{dis}}\right)}{C_{ch}} \quad (1)$$

wherein $\tau^{ch}$ represents the spectral transmittance in the charged state, $\tau^{dis}$ represents the spectral transmittance in the uncharged state and $C^{ch}$ the charge required for the color change. It is apparent from the formula that the coloring efficiency is a parameter that is as such defined independently of the layer thickness, through which, however, the amount of charge required for the color change is connected with the thickness of the layer.

The metal complex compound of the operating electrode can comprise one or more chelating complex ligands and one or more different types of metal cations, where the metal atoms may in turn be surrounded by one or two terpyridyl groups, so that a high molecular chain polymer is formed.

When selecting suitable metal cations according to the invention, it must be noted that these must formally be capable of existing in at least two oxidation states, whereby the optical properties of the complexes (i.e., especially the intensity of the charge-transfer bands) must differ depending on the particular oxidation state. In order to produce energy-efficient electrochromic windows, the cell voltage should preferably be in the range of 0.1-3 V, more preferably in the range of 0.1-1.6 V.

According to the invention, complexes of one or more transition metal cations selected from Cr, Mn, Fe, Co, Ni, Cu, Mo, Ru, Rh, Pd can be used, where Mn, Ru, Fe and Co are preferred, particularly Fe. Fe is particularly preferred because it is distinguished by the advantageous location of the switching potential and a high color contrast, and ferrous complexes of the aforementioned type demonstrate a particularly high cycle stability.

A single complex ligand in combination with a single kind of metal cation can be used, or a single complex ligand with two or more metal cation species, a mixture of two or more complex ligands having only one kind of metal cation, as well as a mixture of two or more complex ligands with a mixture of two or more metal cation species. Iron as the metal ion in combination with a mixture of two or more different chelating complex ligands is preferred, whereby it is particularly preferred for the complex ligands to have at least one aromatic hetero ring. This allows a further increase in the high variability of colors and shades, including gray or brown, and a high variability of the possible switching potentials.

The use of terpyridyl ligand in combination with Fe and Ru cations is preferred, whereby the metal atoms are in turn surrounded by preferably one or two terpyridyl groups.

In order to achieve the broadest, reversibly switchable absorption behavior possible, a plurality of complexes can be mixed whose absorption maxima are suitable for the electron transition of metal to ligand ("metal-to-ligand charge-transfer" MLCT bands), with slightly different wavelengths.

The switchability at similar redox potentials of such mixtures is achieved by a metal cation, such as $Fe^{2+}$, that is always present in a similar, but not identical, coordinative environment (e.g., distorted octahedral surrounded by 6 nitrogen atoms). Conversely, the use of different metal cations can achieve a similar redox potential by the complex formation of the various cations with (only) one suitable ligand. The color of the complex depends on the metal cation and the ligand that were used. Substituents of the ligand also exert a crucial influence on the color of the metal complexes. The influence is based on the electron-withdrawing or -donating effects of the substituents. The position of the absorption band indicates the tendency for a stronger bathochromic band shift the lower the electron density of the donor atom.

To achieve a switching of the electrochromic cells from predetermined color to colorless, either complexes of a specific metal-ligand combination can be used, or mixed complexes, e.g., composed of different metals with a ligand, or of different metals and different ligands, or of a metal and different ligands. By combining one or more metals and one or more ligands, different colors can also be generated. Thus, the color palette can be expanded and a broad absorption range achieved. Ultimately, any color should be obtainable by mixing.

Preferably, the operating electrode further comprises a transparent binder, also referred to as embedding material. This acts as a matrix for the above-described complexing compound(s). It is important that the matrix is optimized such that despite the relatively high solubility of the metal complex(es) in solvents, sufficient fixation of the metal ions is nevertheless ensured. Polymers can be used as the binders that possess good film-forming properties, and a certain ion conductivity. These include for example polyacrylates. Acrylate functional, inorganic-organic hybrid polymers (organopolysiloxanes) have proved especially suitable, as described in the not yet published application EP 14 185 797.9. It is very favorable if the embedding material has both hydroxy groups and organically polymerizable C=C double bonds. This is realized in a first embodiment by using embedding material that comprises units which are substituted with at least one hydroxy group and at least one substituent, which in turn comprises at least one organically polymerizable C=C double bond. These units are preferably either residues bonded by carbon to silicon atoms of an organically modified silicic acid(hetero)polycondensate and/or monomeric units of an organic compound; in the case of a purely organic monomeric compound this is the compound as such, whereas in the case of a polymeric compound each monomer unit therein carries the two named substituents. In a second embodiment, the embedding material comprises a mixture of at least two different units, where a first unit is substituted with at least one hydroxy group and a second unit is substituted with at least one substituent, which in turn comprises at least one organically polymerizable C=C double bond. In this embodiment, the named units are different residues, which are bonded to silicon atoms by carbon, of an organically modified silicic acid(hetero)polycondensate or a mixture of at least two purely organic, monomeric or polymeric compounds, where the first compound is substituted with at least one hydroxy group, and the second compound carries at least one organically polymerizable C=C double bond, or a polymeric compound having at least two different (monomer) units, where the first unit is substituted with at least one hydroxy group and the second unit carries at least one organically polymerizable C=C double bond.

Combinations of variants mentioned within the individual embodiments and variants of the first and second embodiments are naturally also possible. i.e., for example the combination of a silicic acid(hetero)polycondensate with one or more purely organic compound(s).

For the purposes of the present invention the material referred to as "polymer" is composed of more than one monomer and therefore includes so-called oligomers.

The embedding material can, but does not need to, contain additional components which make up preferably not more than 30 wt.-%, more preferably not more than 15 wt.-% of the total embedding material. These components can, but do not need to, carry other reactive groups.

The organically polymerizable C=C double bonds are those that are polymerizable by a so-called addition polymerization, they are preferably acrylic or methacrylic groups, e.g., the corresponding (meth)acrylates, thio(meth)acrylates or (meth)acrylamides.

Organically modified silicic acid(hetero)polycondensates are also known under the protected name ORMOCER®; they are made of, or by employing, hydrolyzable and condensable silanes, which carry groups bonded by carbon to the silicon. According to the invention, at least some of these groups are partly modified by the abovementioned substituents; but alkyl groups or the like may also be present that can carry any other substituent. The term "(hetero)" in brackets in the condensation polymer refers to the possibility that its inorganic network comprises not only silicon, but other hetero atoms, e.g., metal atoms such as Al, Zn, or Zr. This is all known from the prior art.

A polar solvent is used for the material of the operating electrode, which dissolves the metal complex compound(s) and optionally the embedding material. Preferably used is water, a $C_1$-$C_6$ alcohol such as methanol or ethanol, or a mixture of at least two of said solvents, possibly with addition of a high-boiling solvent (having a boiling point preferably above 100° C., e.g., 2-butoxyethanol), preferably an alcohol water mixture such as a mixture of ethanol and water, and most preferably ethanol or an ethanol-methanol mixture.

The presence of OH groups in the embedding material provides it with a suitable polarity, which, for example, ensures that the embedding material is readily soluble in the solvent for the metal complex compound. They also have a favorable effect on the wetting of the substrate and on the adhesion of the embedding material to it. Apart from that, the presence of the organic groups containing C═C double bonds has the effect that the operating electrode remains very flexible, even in cases in which the embedding material consists of or contains a silicic acid(hetero)polycondensate and thus has relatively rigid Si—O—Si groupings.

The amount of the embedding material in the operating electrode is generally selected such that a molar ratio of the complex compound to the embedding material in the solvent is from 10:1 to 1:40, preferably from 1:1 to 1:40 and more preferably from approximately 1.5:1 to 1 4.

The embedding of the metal complex compound(s) in the embedding material causes a surprising improvement of its adherence and thus its presence in the operating electrode layer, with the result that the electrochromic cell can be stably switched through a large number of cycles even at temperatures above 60° C., without the transmission range recognizably decreasing.

The material of the counterelectrode must either be capable of incorporating cations of the electrolyte material, or it must be capable of undergoing a redox reaction.

Due to the variety of available intercalation and redox materials, the skilled person is principally not limited in the choice of material for the counterelectrode. However, several considerations are important if a switching change with a distinct weakening of color is to be possible. Thus, in one embodiment of the invention the counterelectrode exhibits either only very low and preferably no coloring efficiency.

When a material is to be used that has intercalation properties, in particular lithium as a cation of the electrolyte salt, materials can be used for the counterelectrode that, for example, are known as lithium-intercalation electrodes in lithium batteries, provided they have a suitable standard potential. The potential of the counterelectrode must be smaller than that of the operating electrode. The energy required depends on the cell voltage and should be as low as possible (about 1.5 V).

Traditional ion storage materials are suitable for this purpose, such as $V_2O_5$. The films can be doped with $TiO_2$ if desired, providing them with even lower coloring and higher electrochemical stability. Such $V_2O_5$ layers are suitable to provide sufficient charge densities in a MEPE-based electrochromic film full cell. They are therefore fundamentally interesting in terms of achieving neutral tints. For this reason, the use of titanium vanadium oxide ($Ti_{1-y}V_yO_x$) and in particular $TiV_2O_7$ is well suited. This material is capable of intercalating lithium ions; thereby $V^{5+}$ is partially reduced to $V^{4+}$ and $V^{5+}$ is formed again in the back reaction. Titanium vanadium oxide layers can be obtained by sputtering techniques. Other suitable transition metal oxides include for example vanadium(V)oxide, titanium(IV)oxide, cerium(IV)oxide or corresponding mixed oxides. The use of lithium metal oxides and phosphates (e.g., $LiMnO_2$, $LiFePO_4$, $Li_3Fe_2(PO_4)_3$) is in principle conceivable provided that the operating electrode has a higher potential than these materials.

Alternatively, the counterelectrode can consist of a material which changes its color complementary to the operating electrode (i.e., is anodically colorable), so that a reinforcing color effect even results. For example, if the operating electrode changes color from blue (reduced) to colorless (oxidized) during the oxidation of a ferrous MEPE from Fe(II) to Fe(III), the second counterelectrode must be chosen so that it hardly undergoes a color change while the material contained therein is reduced, or that the reduction also turns it blue or to a color that is different from the color of the operating electrode, where the color mixture of the two electrode colors constitutes the color that the eye of the viewer perceives.

Since the MEPEs of the operating electrode are present in a reduced state and colorize cathodically, it is mandatory that in these cases the counterelectrode is in an oxidized state and colorizes anodically. It should be noted that neither the operating electrode nor the counterelectrode are thereby "conditioned," i.e., must be pre-oxidized or pre-reduced before the electrochromic element starts its operation, as is often the case with electrochromic elements of the prior art.

Other anodically coloring metallo-polyelectrolytes are possible, such as copper complexes with bis-1,10-phenanthroline having a fluorene spacer, see Hossain, Sato and Higuchi, in the place indicated, or a mixture thereof.

Another example further uses a material that is accessible to a redox reaction and is thereby able to absorb an alkali ion such as lithium or potassium, namely Prussian blue. The reduction of this material can be represented with the following equation:

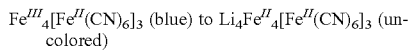
$Fe^{III}_4[Fe^{II}(CN)_6]_3$ (blue) to $Li_4Fe^{II}_4[Fe^{II}(CN)_6]_3$ (uncolored)

Instead of Prussian blue, derivatives thereof may also be used, in which mainly the bivalent iron cations are replaced by other (transition) metal centers such as Co, Ni, Cu, etc.

Prussian Blue is a particularly preferred material for the counterelectrode, in particular when the operating electrode comprises an iron-terpyridyl complex. The charge density of this layer can be accurately adjusted in a simple manner via galvanostatic deposition to correspond precisely to that of the operating electrode. Prussian blue thereby switches exactly complementary to Fe MEPEs from blue in its oxidized state to transparent in the reduced state, so that the operating electrode and the counterelectrode switch simultaneously from blue to colorless (or from colorless to blue), thereby amplifying the color effect. Another advantage of Prussian blue can be seen in its relatively low coloring efficiency. It amounts to only about one fifth of the coloring efficiency of metal MEPE complexes. Therefore, it is easily possible to dimension the charge of this layer larger than that of the MEPE-layer. This can ensure that the highly absorbent MEPE electrode is always fully discharged and a residual color of the cell can thus be avoided. The use of hexacyano metallates, in particular iron hexacyanoferrate ("Prussian Blue") is also particularly preferred because they absorb short wavelength UV light and are capable of protecting the downstream components of the electrochromic element from UV degradation.

The conductive substrate is usually a substrate as is known from the prior art and was already described in part, for example, in the introduction of the present application. Accordingly, the conductive substrate may in principle consist of a non-conductive plastic or glass, which is coated with a thin film of electrically conductive material (applied for example via sputtering technique or physical or chemical vapor deposition). Possible plastics that are used as substrates are, e.g., polyester such as polyethylene terephthalate (PET) or polyethylene naphthalate (PEN). Such substrates are commercially available and allow the production of flexible or curved ECDs. The conductive surface coatings may consist of a transparent conductive metal oxide (TCO). Important representatives here are mainly ITO (tin-doped indium oxide) and aluminum or gallium-doped zinc oxide (AZO or GZO). For glass, the fluorine-doped tin oxide (FTO) should be mentioned in particular, a material that has not yet been deposited directly onto plastic substrates because of the temperatures necessary during the production. Other than such inorganic semiconductor layers, organic-polymeric conductive materials can also be used, such as PEDOT [poly(3,4-ethylenedioxy)thiophene], a polymer with a low bandgap. Such polymers are usually deposited by wet-chemistry, for example, via a roll-to-roll process (R2R). Finally, a whole series of metal mesh electrodes ("grids") or surface-coated metal substrates are known which may also be suitable for use for the electrochromic elements according to the invention. The types of metal structures are usually prepared via vapor deposition, sputtering or printing methods, depending on whether a planar surface is coated or structures are to be produced. Combined processes are also known (e.g., vapor deposition of a metal layer followed by chemical etching).

In a preferred embodiment, the two conductive substrates of the electrochromic element are identical, between 75-175μ thick and consist of a highly conductive plastic film or of a plastic film rendered highly conductive on the inwardly facing surface. For this purpose, it is preferably provided with a TCO layer, a layer stack of the "IMI-type" (insulator-metal insulator, whereby the term "isolator" for the purposes of the invention is to be understood as meaning a semiconductor material such as TCO or a conductive polymer, also referred to as "organic metal"), an optionally over- or under-coated metal grating of any structure, an electrically conductive polymer layer or mixed forms thereof. In particular, coating systems can be used which have a metal layer or structure that is coated with an electrically conductive or semi-conductive material. This kind of an electrochromic element is referred to as film full element or film full cell.

In a special embodiment, the conductive substrates are asymmetrical; one side of the cell has, for example, a flexible plastic substrate as described above, the other side is made of a rigid substrate such as a glass substrate (preferably 0.1 to 20 mm thick; suitable are, for example, soda-lime glasses and their mixed forms, in particular green glasses, furthermore aluminosilicate glasses, borosilicate glasses or other standard glasses used in the automobile industry, the electronics industry, or the construction industry). The inside of the substrates are provided in any manner, either both with a TCO layer, a layer stack of "IMI-type," an optionally over- or undercoated metal grating of any structure, an electrically conductive polymer layer or mixed forms thereof, or they have different layers/layer systems that ensure the electrical conductivity. This type of an electrochromic element is referred to as a hybrid element or a hybrid cell.

It is generally advantageous for the sheet resistance of the substrates to be as low as possible. A simulation of the switching behavior of large-area electrochromic elements has shown that the sheet resistance is the decisive factor for achieving short response times. To achieve switching times that are significantly less than 1 min in an area of 1×1.5 m$^2$, sheet resistances below 10 Ohm are usually required. By incorporating circuit paths, switching times of less than 1 min can also be achieved with higher sheet resistances.

Transparent conductive films consisting of thin metal layers on plastic films that are structured in the micrometer range (e.g., the product PolyTC®) have sheet resistances below 5 Ohm. U.S. Pat. No. 6,040,056 describes transparent films that are enriched which a stack of reflection-reducing thin films (zinc-indium mixed oxides; IZO) and one or more metal layer (silver or silver as the main component). These substrates have sheet resistances in the range of between 2.5 to 1.5 Ohm.

The entire electrochromic element can have a thickness of 150 to 500 μm, and must be distinguished by a sufficient interlayer adhesion and mechanical flexibility. This can be achieved with a polymer electrolyte material according to the preferred embodiment above. The exact thickness of the element will be based on the area of application. Sufficient mechanical stability and protection against short circuits is achieved by the following combination: 25-500 μm, preferably 100 to 200 μm and more preferably 125 μm of conductive substrate/0.1-1.5 μm, preferably 0.2-1.0 and particularly preferably 0.300 μm active OE material/1-400 μm, preferably 1 to 200, more preferably 20-150, even more preferably 20 to 100 and more preferably 100 μm electrolyte/0.05-1.0 μm, preferably 0.1-0.5 μm and particularly preferably 0.2 μm active CE material/25-500 μm, preferably 100-200 μm and most preferably 125 μm conductive substrate.

The flexible electrochromic element of the invention is produced in a preferred embodiment by coating and laminating together all layers via a continuous coating method such as roll-to-roll processing. Both physical (during the film substrate production) and wet chemical methods (during the deposition of the active layers and the electrolyte layer) are used. The preferred preparation method of the invention comprises the following steps:

Step 1: Production of the Operating Electrode:

This step is preferably carried out by wet chemical, continuous deposition from the liquid phase onto the electrically conductive surface of the substrate, for example (but not exclusively) via slot die coating.

Step 2: Production of the Counterelectrode:

This step is preferably performed via continuous deposition from the liquid phase, for example (but not exclusively) via a galvanic process such as the electrode position, or from a nanoparticle preparation onto the electrically conductive surface of the substrate.

Step 3: Assembly of the Electrodes:

This step is performed by cutting (for sheet-to-sheet processing) (step 3A) or by the processing of the roll media (for roll-to-roll processing) (step 3B)

Step 4: Production of the Electrolyte Layer:

This step is preferably carried out by wet chemical, continuous deposition from the liquid phase, for example (but not exclusively) through slot die coating. The electrolyte layer may be deposited onto either the operating electrode or onto the counterelectrode; alternatively, it may be deposited onto a support substrate, solidified by polymerization and then removed from the support substrate, and then coated or laminated as an independent ("self-supporting") component onto the coated substrates.

Step 5: Assembly of the Electrodes:

This step is carried out by manual lamination of the electrode sheet material from steps 1, 2 and 3A by means of the electrolyte material from step 4 (for sheet-to-sheet processing) that was deposited onto one of the electrodes, or by continuous lamination of the electrode-roll material from steps 1, 2 and 3B by means of the electrolyte material from step 4 (for roll-to-roll processing) that was deposited onto one of the electrodes, or by coating and/or laminating the three components substrate/operating electrode, substrate/counterelectrode and self-supporting electrolyte layer.

Step 6: Sealing and Contacting:

The contacting of the two electrodes can be effected by adding the two conductive substrates—the contact can then be demonstrated via electrically highly conductive, opaque or transparent conductor tracks (e.g., metal strips) on the uncoated edges of the electrochromic element, as shown in FIG. 3. To achieve lowest switching times, complete contact in the edge region is required. In order to achieve optimum switching times, the lengths of the contacts for the operating and counterelectrodes should be the same, i.e., half of the total circumference of the active region.

A second possibility for contacting, shown in FIG. 4, through which even shorter response times can be achieved, is to have all-round contact on both sides. In this case, the two conductor tracks must be electrically isolated from each other via the sealing. This is primarily due to the low tolerances with respect to the height and spacing of conductor tracks/contacts, the half-cell positions relative to one another, and the higher requirements placed on the sealing. In this case of contact, two highly conductive paths are namely directly opposite/above each other at a small distance. The distance is calculated from the thickness of the two electrodes and the electrolyte layer minus the thickness of the conductor tracks (this can be derived from FIG. 3 from the vertical distance between the quadrants labeled "contact"). A short-circuit through seals must not occur, which must therefore be better isolated than in the first case where a highly conductive contact track must merely be separated from the diagonally opposite TCO layer of the other electrode.

In a 7th step, the electrochromic element of the invention can be integrated using common lamination techniques into a laminated glass ("laminated safety glass"):

In a first embodiment of the invention, in which both substrates are composed of flexible plastic materials (full film element), this step can be prepared by laminating the finished electrochromic element between two PVB or PET films via conventional methods used for laminated glass production. In this case, the cross section of the glass panel has the following structure:

Glass/adhesive film (such as PVB or PET)/substrate film with conductive layer/operating electrode/electrolyte/counterelectrode/substrate film with conductive layer/adhesive film (e.g., PVB or PET)/glass.

In a second embodiment, in which the electrochromic element is a hybrid element in which one substrate consists of a glass panel, only one (second) glass layer/panel is laminated to the film side of the hybrid element with the aid of an adhesive sheet (e.g., a PVB or PET film). In this case, the cross section of the glass panel has the following structure:

Glass substrate with a conductive layer/OE or CE/electrolyte/CE or OE/substrate film with a conductive layer/adhesive film (e.g., PVB or PET)/glass Another variant involves laminating the film full element between two PMMA or PC panels or other forms of plastic glazings. In this case, the cross section of the glass panel has the following structure:

Plastic panel/adhesive film (PVB or PET)/substrate film with a conductive layer/operating electrode/electrolyte/counterelectrode/substrate film with a conductive layer/adhesive film (PVB or PET)/plastic panel Moreover, there is the possibility of laminating a film full cell with two adhesive film layers between a glass and a plastic panel. Further variants of the above-described hybrid-composite element are possible, in which one or both of the glass layers/panels can be replaced by hard plastic plates/panels (PC or PMMA).

The electrodes can in principle be assembled
a) directly on a roll-to-roll system ("roll-to-roll"), i.e., continuously, or
b) after cutting the electrodes, i.e., manually or semi-automatically ("sheet-to-sheet").

The steps are particularly preferably carried out in detail as follows:

The operating electrode is typically prepared by a method comprising the following steps:
(A) Providing a conductive substrate that consists of a glass or plastic base material and that has an electrically highly conductive coating and/or structure on its surface as described above and preferably has a sheet resistance of ≤30 Ohm, more preferably of ≤10 Ohm.
(B) Preparing a liquid composition comprising (a) at least one, preferably at least two metal complex compounds which is/are capable of entering into a redox reaction, where the transition from the oxidized to the reduced state is attended by an increase of color depth, and the transition from the reduced to the oxidized state is attended by a corresponding weakening of color (also referred to as cathodically coloring metallopolymers or MEPEs), where in the case that at least two of these metallopolymers are used their light absorption properties complement each other, (b) one or more solvents, preferably from the group of alkanols and ether alkanoles, (c) optionally a suitable binder, preferably (but not exclusively) from the group of inorganic-organic hybrid polymers (hereinafter referred to in this context as "HP") or polysiloxanes, and most preferably an organically modified hybrid polymer or polysiloxane that can be organically crosslinked, in combination with a crosslinking initiator (d) (with thermal or photochemical mechanism);

or (B') Preparing two liquid compositions (a, a') each consisting of at least one cathodically coloring metalopolymer as defined above with complementary light absorption properties, (b) one or more solvents, preferably from the group of alkanols and ether alkanole, (c) optionally a suitable binder, preferably (but not exclusively) from the group of inorganic-organic hybrid polymers (hereafter referred to in this context as "HP") or polysiloxanes and most preferably an organically modified hybrid polymer or polysiloxane that can be organically crosslinked, in combination with a crosslinking initiator (d) (with thermal or photochemical mechanism);
(C) Applying said composition(s) to the substrate by a common coating method, preferably continuous slot die coating in a roll-to-roll process;
(D) Drying and compacting the layer(s) applied in this way by thermal post-treatment and/or infrared drying.

The counterelectrode can be prepared by a method comprising the following steps:
(A) Providing a conductive substrate that consists of a plastic base material and that has an electrically highly conductive coating and/or structure on its surface as described above and preferably has a sheet resistance of ≤30 Ohm, more preferably of ≤10 Ohm;
(B) Preparing a liquid composition of one or more metal (III) salts or a stable suspension of hexacyanoferrate nanoparticles, optionally with the use of stabilizing additives and binders;

or (B') Preparing a liquid composition of transition metal alkoxides, and transferring same into oxide or mixed oxides, as named above as materials for the CE, by hydrolytic condensation;

or (B") Preparing a liquid composition of one or more anodically coloring metallo-polymers and optionally a suitable binder, for example, one of the binders described above as the embedding material for the operating electrode (C) Depositing the composition to form a thin layer of the counterelectrode material on the substrate, preferably continuously in a roll-to-roll process, in particular in either a casting process (slot die coating) or galvanically/electrophoretically.

The application of both electrode materials can thereby include pre-treatment steps, such as the activation of the substrate via the Corona treatment, or the application of primer layers onto the substrate before the actual active material is applied.

The production of the polymer electrolyte layer is advantageously performed in the following way:

(A) The above-described components for the polymer electrolyte are mixed to form a polymer electrolyte precursor.

(B) The liquid or pasty precursor can be applied directly onto the layer of the operating electrode or onto the counterelectrode to form a polymer electrolyte precursor layer. In a preferred embodiment, the application is performed by a doctor's blade, slot die, or other wet chemical application method. The electrode coated in this way is then assembled together with the other electrode, preferably via a coating or laminating method to form the electrochromic element.

(B') Alternatively, the liquid precursor is applied to a support substrate to form a polymer electrolyte precursor layer.

(C) The electrolyte layer is subsequently irradiated with UV light or short-wavelength visible light in order to induce photochemical crosslinking. This is preferably done through the counterelectrode. The use of photoinitiators may be necessary in this case. Alternatively, the crosslinking can also be thermally induced, e.g., by adding a thermal radical initiator to the polymer electrolyte precursor, followed by heat treatment. Crosslinking may alternatively be carried out before the electrodes are assembled. The application of the liquid electrolyte composition and the assembly are preferably performed by continuous processes.

The dry film thickness of the cathodically coloring active material of the operating electrode is in the range between 50 nm to 1000 nm, preferably in the range between 200 and 500 nm. The dry film thickness of the anodically coloring active or ion storage material of the CE depends on the charge density ("capacity") of the CE and may be between 50 nm and 1000 nm depending on the material and storage capacity. An operating electrode preferably produced from usable MEPE compounds generally has a charge density of 1-10 $mC/cm^2$, preferably 2 to 5 $mC/cm^2$, measured by galvanostatic charging and discharging at defined current densities in a liquid electrolyte consisting of 1M $LiClO_4$ in propylene carbonate. According to the invention, the charge density of the CE should preferably be 0-30% greater relative to the charge density of the operating electrode.

The entire electrochromic element may have a thickness of 150 to 500 μm and must be distinguished by sufficient interlayer adhesion and mechanical flexibility. This is possible with a polymer electrolyte material according to the above preferred embodiment. The exact thickness of the element will depend on the area of application. Sufficient mechanical stability and protection against short circuits is achieved by the following combination: 125 μm (conductive substrate)/0.300 μm (active OE Material)/100 μm (electrolyte)/0.2 μm (active CE material)/125 μm (conductive substrate).

The described combination of materials (and in particular the effect of the cathodically coloring MEPE mixtures and the use of highly conductive substrates of the IMI-type) allows to achieve high bright transmission in combination with short switching times and the possibility of color adaptation. This property profile is essential for automobile applications and cannot be achieved with other material combinations. In addition to the electrochromic function, the film must also have a number of other properties, such as mechanical flexibility and good interlayer adhesion in order to enable the production of laminated safety glass by means of conventional industrial laminating processes. This is achieved with the polymer electrolyte material according to the invention, which consists of four or five or optionally six components with unique characteristics (adhesiveness, strength, conductivity, yellowing, flexibility). The main advantage is that such a material remains mechanically stable during the application, but shows softening during the lamination process, which improves the properties of the overall assembly. At the same time, the material must have a transmittance of close to 100%.

The electrolyte can be further optimized by means of a nanoparticle preparation. The incorporation is preferably not by purely physical means, but via covalent bonding of the particles to the polymer electrolyte, which greatly reduces the sedimentation and agglomeration tendency. The effect is reduced shrinkage during crosslinking (form stability).

Accordingly, the electrochromic element of the present invention can be used for complete panels, or glasses, or for portion of panels or glasses, whereby the electrochromic element is homogeneously or non-homogeneously applied to the surface or a partial surface (i.e., with different compositions, especially of the operating electrode or the counterelectrode, and optionally also other components of the electrochromic element). Among other applications, it is suitable for the following, but not exclusive, applications:

Vehicles
    Windshields
    Wind deflector (motorcycles)
    Rear windows
    Side windows (fixed and movable or in front of and behind the B-pillar)
    Roof panels and sunroofs (fixed and mobile)
    Partitions
    Displays/panels
    Engine compartment or other covers
    Motorcycle/bicycle helmet visors
Rail vehicles
    Front and side windows of railcars/locomotives
    Side windows, doors and partitions in cars/wagons
    Display/panels
Aircraft
    Cabin windows
    Partitions
    Displays/panels
Ships
    Cabin windows
    Partitions
    Displays/panels
Intelligent architectural glazings
    Outside windows for buildings (smart windows)
    Skylights
    Partitions Eyewear
  Sunglasses
  "Smart glasses"
  Virtual reality glasses
  Ski goggles
Domestic appliances The invention will be explained in more detail below based on a series of examples, without these examples to be viewed as limiting.

PREPARATION EXAMPLE 1

Synthesis of a Hybrid Polymer Resin
(ORMOCER@ Resin 1)

27.03 g of a 0.1 M HCl solution are slowly added dropwise to 248.35 g of 3-(trimethoxysilyl)propylmethacrylate (MEMO) at a temperature <10° C. and stirred for 2 hours (=reaction solution A). 88.65 g Zr(n-OPr)$_4$ are added to a second reaction flask and cooled to <5° C. 17.2 g of methacrylic acid (MAS) are added dropwise and the mixture stirred for 0.5 h (=reaction solution B). Then reaction solution A is brought to <10° C. and the reaction solution B added dropwise such that the reaction temperature is between 4-10° C. After the addition is completed, the reaction mixture is allowed to warm up slowly to RT and stirred for 2 days. The solvent is first removed on a rotary evaporator, then by high vacuum. This yields 298.72 g of a yellowish orange, transparent resin.

PRODUCTION EXAMPLE 2

Synthesis of an Acrylate-Functional Hybrid Polymer Base Resin (HP) (BS-II)

Step 1

38 ml of 4N hydrochloric acid is added dropwise to 40 g (0.08 mol) 3-glycidyloxypropyl methyldiethoxysilane at room temperature under stirring and stirred at room temperature for 3 days. After workup (washing with water, taking up in ethyl acetate, drying over sodium sulfate and removing volatile components), a liquid resin with a high degree of condensation (>90%) and complete ring opening of the epoxide group is obtained. The viscosity of the resin is 22 Pa·s at 25° C.

Step 2

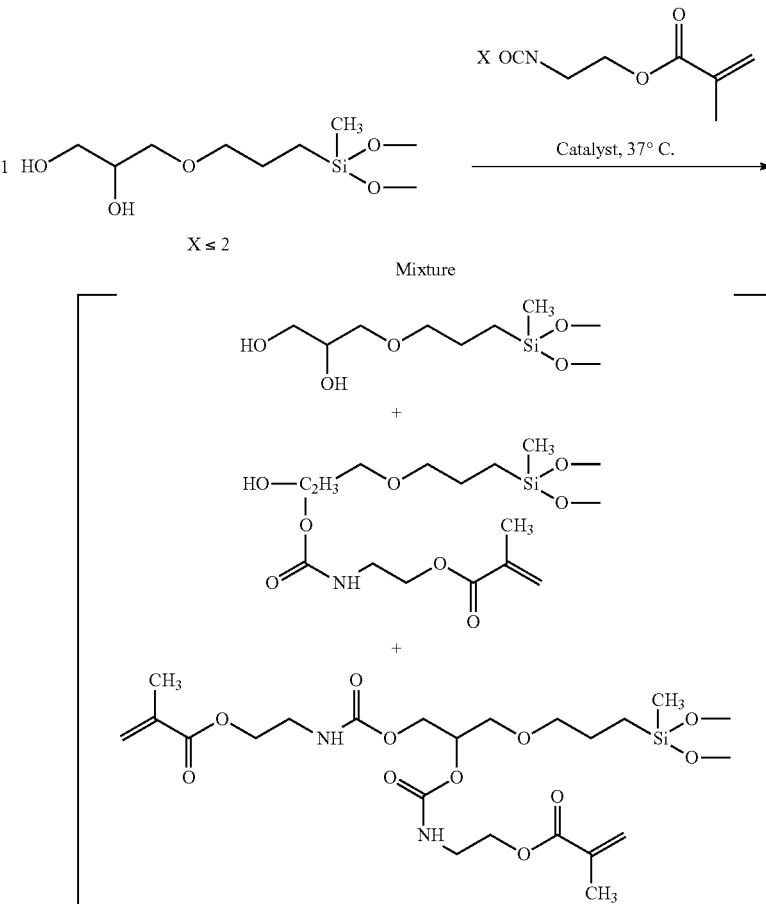

X mol (see following table) of methacrylic acid isocyano ethylester is added dropwise to a mixture of 20 g (0.104 mol) resin from step 1, 24 mg BHT and 61 mg dibutyltin didodecanate and optionally anhydrous THF solvent under a dry atmosphere at 37° C. with stirring and stirring continued at 37° C. The conversion can be tracked via the reduction of the OCN band by IR spectrum. The band characteristic of the OCN group appears in the IR spectrum at 2272 cm$^{-1}$. After removal of the THF, liquid resins result. For further experiments, a mixture was used that has a ratio of silicon atoms to methacrylate groups of 4:1 (i.e., 0.25 mol isocyanate were used per condensated silane unit).

| BS-II | X [mol] | Viscosity [Pa s] |
|---|---|---|
| A | 0.026 | 12 |
| B | 0.052 | 73 |
| C | 0.104 | 153 |

EXAMPLE 1a

Preparation of a Polymer Electrolyte Formulation 0.30 g of ethyl methacrylate-methyl acrylate copolymer Paraloid B72 (dried) are dissolved in 3:00 g of dry propylene carbonate at around 40° C. and 0.29 g of lithium perchlorate (battery grade) is added. The solution is stirred at room temperature (RT) under a dry atmosphere overnight. Thereafter, 0.35 g of the ORMOCER® resin 1 from the preparation example$_{[FR3]}$, 0.65 g triethyleneglycol dimethacrylate, and 0.02 g Irgacure 651 (photoinitiator) are added and the mixture packaged light-tight. After approximately 1 hour, a homogeneous, viscous solution has developed, which can be used directly for the cell assembly.

EXAMPLE 1 b

Preparation of a Polymer Electrolyte Formulation 0.25 g of polymethyl methacrylate (MW=20,000) (dried) are dissolved in 0.4 g dry ethylene carbonate at approximately 40° C. and 0.12 g of lithium perchlorate is added. The solution is stirred at RT under a dry atmosphere overnight. Thereafter, 0.1 g of the ORMOCER® resin from Preparation Example 2, and 0.25 g triethyleneglycol dimethacrylate, and 0.02 g Irgacure 651 (photoinitiator) are added and the mixture packaged light-tight. After approximately 1 hour, a homogeneous, viscous solution has developed, which can be used directly for the cell assembly.

EXAMPLE 1c

Preparation of a Polymer Electrolyte Formulation 0.03 g of the ethyl methacrylate-methyl acrylate copolymer Paraloid B72 (dried) are dissolved in 1.00 g of dry tetraethylenegylcol-dimethoxyether at approximately 40° C. and 0.33 g of lithium-bis(trifluoromethane)sulfonimide is added. The solution is stirred at RT under a dry atmosphere overnight. Thereafter, 0.60 g of the ORMOCER® resin 1 from the preparation example$_{[FR4]}$ and 0.06 g hexanedioldiacrylate and 0.02 g Irgacure 651 (photoinitiator) are added and the mixture packaged light-tight. After approximately 1 hour, a homogeneous, highly viscous solution has developed, which can be used directly for the cell assembly.

Comparison of the Values Obtained Under Tensile Shear of Polymer Electrolyte Formulations According to the Invention with Those of a Polymer Electrolyte without a Crosslinkable Hybrid Prepolymer and without Reactive Diluents A tensile shear test, which is usually performed using a "pinch testing machine," allows to make statements about the adhesion between the substrate and electrolyte layer and is currently the most widely used test equipment for adhesive compounds. In this measurement method, two overlapping film strips are "glued" to the electrolyte material. As multiple specimens are required for the evaluation and the tensile shear strength is strongly dependent on the area of overlap, is must always be strictly observed that areas of the exact same size are glued together. The strips are clamped vertically in a traction device. The force required until the sample tears is measured via a load cell.

Electrolyte 1 (MB30=comparative test; contains only Paraloid B72 and 1M LiClO$_4$ in PC)=8 kPa Electrolyte 2 (TM067=5 component electrolyte according to Example 1c)=138 kPa Electrolyte 3 (TM069=5 component electrolyte according to Example 1a)=356 kPa All three electrolyte materials were crosslinked in the presence of light. The results are shown in Table 3 below and in FIG. 16 in which the values for the electrolyte 1 are presented at the top and the values for electrolytes 2 and 3 in the middle, and bottom. It is revealed that electrolyte 2 and electrolyte 3 are clearly superior to a simple organic electrolyte 1 with respect to tackiness and adhesion. Electrolyte 3 was significantly improved in terms of tackiness and adhesion by optimizing the 5 components.

TABLE 3

Tensile shear strength. Dimensions of the measured sample: 25 × 25 × 100 mm, Repetitions: N = 10

| ID | Max force/N | s/N | dL/mm | s/mm | Tensile shear strength/kPa | S/KPa |
|---|---|---|---|---|---|---|
| MB30 | 5 | 7 | 0.14 | 0.06 | 8 | 11.4 |
| TM067 | 86 | 12 | 0.54 | 0.09 | 138 | 19.2 |
| TM069 | 222 | 26.4 | 1.62 | 0.29 | 356 | 42.3 |

EXAMPLE 1d

Preparation of Surface-Modified Silica Nanoparticles

The functionalization of the silica nanoparticles "Ludox AS40" (aqueous suspension, 20 wt.-% particle content) was carried out according to Posthumus et. al. (*Journal of Colloid and Interface Science* 269 (2004), 109-1167). 10.00 g of the silica nanoparticle suspension is placed in a 100 ml flask and diluted with 3.33 g distilled water. After the addition of 25.00 g of methanol and 0.80 g of 3-methacryloxypropyltrimethoxysilane, the mixture was stirred under reflux at 70° C. for 4 h. The subsequent cooling of the suspension caused a weak cloudiness as a result of weak coagulation of the functionalized silica nanoparticles, which was resolved by the addition of 10.00 g n-propanol. The volatile components were removed on a rotary evaporator under reduced pressure until a wet gel remained in the flask. By subsequent addition of 12.00 g n-propanol and treatment for 15 min in ultra-sound, a clear suspension was obtained again. The solids content was 33.7 wt.-%

EXAMPLE 1e

Incorporation of the Nanoparticles into the Ormocer Resin

The incorporation of the silica nanoparticles the surface of which was functionalized with 3-methacryloxypropylt-rimethoxysilane was accomplished by the addition of 14.75 g of the nanoparticle suspension according to Example 1d to 11.60 g of ORMOCER® resin 1. The particle concentration in ORMOCER® was 30 wt.-%. Stirring resulted in a clear dispersion of the silica nanoparticles in a mixture of n-propanol and ORMOCER® resin 1. Subsequently, the added amount of n-propanol was removed at 50° C. under reduced pressure in a rotary evaporator. The mixture obtained was transparent and clear.

EXAMPLE 1f

Production of a Polymer Electrolyte Composition with Surface-Modified Silica Nanoparticles 0.20 g of the ethyl methacrylate-methyl acrylate copolymer Paraloid B72 (dried) are dissolved in 0.816 g of a mixture of propylenecarbonate-diethylene carbonate (ratio=3:7) with a content of 1 molar $LiClO_4$ at approximately 40° C. The solution is stirred at room temperature (RT) under a dry atmosphere overnight. Then, 0.30 g of the ORMOCER® resin 1 from Preparation Example 1, 0.60 of the silica nanoparticles from Example 1d, 0.20 g of triethyleneglycol dimethacrylate and 0.02 g Irgacure 651 (photoinitiator) are added and the mixture packaged light-tight. After approximately 1 hour, a homogeneous, highly viscous solution has developed, which can be used directly for the cell assembly.

EXAMPLE 2a

Preparation of a HP/MEPE L1—Coating Solution 1.33 g of the acrylate functional hybrid polymer base resin BS-II A from the Preparation Example 2 are dissolved in 50 ml MeOH/EtOH (90/10 wt %)+12.5 wt % 2-butoxyethanol and stirred for 24 h at RT. To this solution is added 1.25 g (1.75 mmol) Fe-MEPE-L1 (formula see Table 2 above) and stirred at RT for another 24 h until a homogeneous solution is obtained. The Fe-MEPE L1 concentration in the solution is 35 mM and the molar ratio of hybrid polymer to Fe-MEPE-L1 is approximately 3:1 (can also be varied as needed). The HP/MEPE solution can then be used as a coating material for producing the operating electrode.

EXAMPLE 2b

Preparation of A HP/MEPE L1 Thin Film Via Dip Coating

Figure 5:
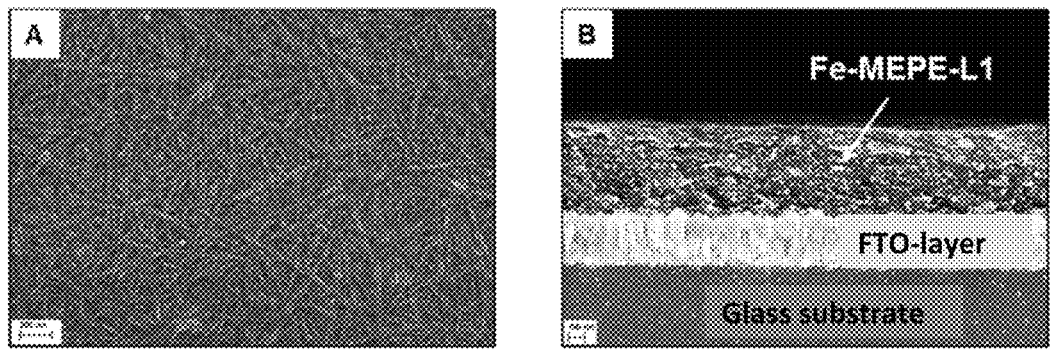

Prior to coating, the substrates are cleaned with EtOH and compressed air. The coating solution from Example 2a is applied by a dip-drawing system onto FTO glass with a drawing speed of 30 mm/min and heat-treated after the coating for 24 h at 60° C. FIG. 5 shows SEM images of a HP/Fe-MEPE-L1 (3:1) electrode obtained in this way: in FIG. 5A, the surface can be seen and in FIG. 5B an edge. The layer is deep blue-transparent (haze <1%), homogeneous and has very low surface roughness. The film thickness is 590 nm.

EXAMPLE 2c

Spectroelectrochemical Characterization of a HP/MEPE L1 Thin Film Produced by the Dip-Drawing Method The measurement was performed in a spectroelectrochemical cell (glass cuvette with Teflon lid) in combination with a UV-Vis spectrometer with fiber optic cables. The electrochemical cell consists of a HP/Fe-MEPE layer on TCO substrates as an operating electrode (OE), a platinum wire as a counterelectrode (CE) and a liquid electrolyte (e.g., 1M $LiClO_4$ in PC). A power supply was used as a voltage source, and the layers contacted using copper tape and alligator clips.

FIG. 6 shows an in situ spectroelectrochemical half-cell measurement of the electrochromic properties of the HP/Fe-MEPE L1 layer from Example 2c. 1 M $LiClO_4$ in PC (propylene carbonate) was used as electrolyte. The color values are shown. The film switches from a deep blue to a pale green, almost colorless tone at a voltage of 2.5 V. In the example shown here a transmission range $_{\Delta TV}$ of 62% was achieved (according to DIN E410).

EXAMPLE 2d

Production of an HP/MEPE L1 Thin Film Via Slot Die Coating in a Roll-To-Roll Process 200 ml of a coating solution prepared according to Example 2a are filtered and applied to PET ITO film by means of a micro annular gear pump and a slot die with a width of 250 mm in a roll-to-roll method. A selected set of possible coating parameters is summarized in Table 4.

TABLE 4

Production parameters for producing a HP/MEPE L1 thin film in a roll-to-roll process.

| Corona | Mask [µm] | Pump dosing volume [ml/min] | Drying | Layer width [mm] | Band speed [m/min] | Wet film thickness (calculated) [µm] |
|---|---|---|---|---|---|---|
| Optional | 50 | 2.5 | 120° C. | 250 | 0.8 | 12.5 |

EXAMPLE 2e

Spectroelectrochemical Characterization of a HP/MEPE-L1 Thin Film Produced by Means of Slot Die Coating in a Roll-To-Roll Process FIG. 7 shows an in situ spectroelectrochemical measurement (A) and L*a*b* values (B) of the electrochromic properties of the HP/Fe-MEPE L1 layer (ratio 3:1) from Example 2d. 1 M $LiClO_4$ in PC (propylene carbonate) was used as an electrolyte. The film switches from a deep blue to a pale green, almost colorless tone at a voltage of 2.5 V. In the example shown here a transmission range $_{\Delta TV}$ of 52% was achieved for this color transition (according to DIN E410). At negative voltage, the layer switches to a gray-green colored state. It has surprisingly been found here that the MEPE uniformally absorbs visible light in this state. i.e., as a broad band spread over the entire spectrum. This property is of great interest for use in the automotive sector, since it potentially allows to modulate incident sunlight into a neutral color.

EXAMPLE 2f

Production of a HP/MEPE-L0 Thin Film Via Dip Coating

Prior to coating, the substrates are cleaned with EtOH and compressed air. A coating solution of 28 mM Fe-MEPE-L0

Figure 8:
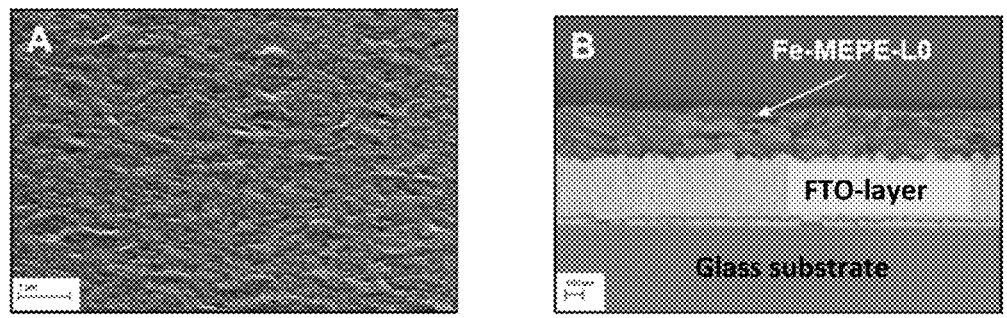

(formula see Table 2 above) in EtOH is prepared analogously to Example 2a, but without hybrid polymer binders and applied using the dip-drawing process with a drawing rate of 50 mm min$^{-1}$ onto FTO glass or PET-ITO film and tempered after coating for 24 h at 60° C. FIG. 8 shows SEM images of a HP/Fe-MEPE-LO (3:1) electrode obtained in this way: in FIG. 8A, the surface can be seen and in image 8B an edge. The layer has very low surface roughness, the layer thickness is approximately 250 nm.

EXAMPLE 2g

Spectroelectrochemical Characterization of a HP/MEPE LO Thin Film Produced by Dip-Drawing Process FIG. 9 shows an in situ spectroelectrochemical measurement (A) and L*a*b* values (B) of the electrochromic properties of the HP/Fe-MEPE-LO-layer from Example 2f. 1 M LiClO$_4$ in PC was used as the electrolyte. The film switched from a turquoise blue to a pale green, almost colorless shade at a voltage of 2.0 V. In the example shown here, a transmission range $_{\Delta TV}$ of 57% was achieved for this color transition (according to DIN E410). At negative voltage, the layer turns into a neutral-colored, gray state. The absorption band shifts from the visible to the infrared range. This observation was also surprising. Visible light in this state becomes broad-band and is spread over the entire spectrum, i.e., is absorbed color-neutral. In addition, an absorption of infrared radiation occurs, which enables an even further modulation of incident sunlight and the concomitant heat input.

EXAMPLE 2h

Preparation a Thin Film Containing Two MEPE

Prior to coating, the substrates are cleaned with EtOH and compressed air. A coating solution composition prepared analogously to Example 2a with 15 mM HP/Fe-MEPE-L1 and 15 mM HP/Fe MEPE-LO in EtOH/MeOH/2-butoxyethanol is applied using the dip-drawing process with a drawing speed of 50 mm/min on FTO-glass or PET-ITO film and tempered after the coating for 24 h at 60° C. The example was repeated with drawing speeds of 70 and 100 mm/min. FIG. 10 shows a photograph (A) and the absorption spectra (B) of an HP/Fe-MEPE L0/L1 (1:1) electrode obtained in this manner with different layer thicknesses on FTO glass. The maximum of the MLCT band is around 613 nm.

EXAMPLE 2i

Production of Two Thin Films Each Containing a MEPE

Prior to coating, the substrates are cleaned with EtOH and compressed air. A coating solution prepared analogously to Example 2a with 15 mM HP/Fe-MEPE-LO in EtOH/MeOH/2-butoxyethanol is applied by the dip drawing process at a drawing rate of 100 mm·min$^{-1}$ on FTO-glass or PET-ITO film and heat-treated after coating for 24 h at 60° C. Thereafter, the coating performed with a second coating solution consisting of 15 mM HP/Fe-MEPE-L1 in EtOH/MeOH/2-butoxyethanol, likewise by means of the dip-drawing method and a drawing rate of 30 mm·min$^{-1}$ After coating, the layers are again heated for 24 h at 60° C. FIG. 11 shows an absorption spectrum of an HP/Fe-MEPE-LO electrode obtained in this way, which was coated with a HP/Fe-MEPE-L1 layer. The maximum of the MLCT band is around 596 nm.

EXAMPLE 3a

Preparation of an Optically Active Ion Storage (Pb) (Counterelectrode Layer)

PB layers are galvanostatically deposited from an aqueous solution of 0.01 MK$_3$Fe(CN)$_6$, 0.01 M FeCl$_3$■ .6H$_2$O and 0.01 M HCl using an electrophoretic dip coating system onto FTO glass or PET-ITO film. At constant current density, and appropriate time, the desired separation capacity can be controllably adjusted: For this example, the favorable value of 80 nm film thickness was selected. FIG. 12 shows an absorption spectrum of such a PB-layer with a separation capacity of 3.6 mC cm$^2$ on FTO glass. The maximum of the metal-metal charge transfer (MMCT) transition of PB, which is responsible for the blue color, is about 712 nm.

EXAMPLE 3a

Measurement of an Optically Inactive Ion Storage Layer (V$_2$O$_5$)

A V$_2$O$_5$ layer prepared on PET ITO film according to M. Hajzeri et al. (Solar Energy Materials & Solar Cells 99 (2012) 62-72) is measured in the UV-VIS spectrometer. Such V$_2$O$_5$ layers adhere very well to PET ITO film, show only a weak electrochroism (=>low optical modulation) and usually have coloring efficiencies of <±20 cm$^2$/C. The sheet material shows a broad absorption in the blue spectral range, which confers to it a yellowish color. FIG. 13 shows a transmission spectrum of the layer with a visual transmittance $_T$v=71%.

EXAMPLE 4a

Preparation of a Full Cell, Using a Manual Method

The full cell can, as shown above, be assembled congruently or staggered. The technical process is similar in both cases. Specifically, a polymer electrolyte was applied onto a first electrode according to Examples 2b, 2f, 2h and 2i using a film-drawing device and a film-drawing frame according to Example 1 b. The second electrode (according to Example 3a) was then coated onto the first electrode coated with electrolyte. In both cases, PET-ITO-film was used as a substrate with a sheet resistance of 50 Ohm with an electrically conductive surface on the inside. The film stack thus formed was laminated under moderate pressure. Subsequently, the electrolyte layer was crosslinked by means of UV light, and the cell sealed at the edges with a 2-component adhesive. Lastly, the contacts at the free edge locations along the cell were applied in an L-shape or applied circumferentially.

EXAMPLE 4b

Preparation of a Full Cell Using The Roll-To-Roll Process

A film stack as described in Example 4a was prepared via a continuous process, according to EP 2570846 A1. For this purpose, the polymer electrolyte was applied (according to Example 1 b) by means of a slot die onto the first electrode (according to Example 2d) in a roll-to-roll process. The second electrode was then cold laminated, once congruently and once staggered, depending on the contacting concept, to the first electrode with moderate pressure ("in slot"). On the lateral free edges the contact (self-adhesive metal strips) was applied manually. Finally, the polymer electrolyte was cured by means of a roll-to-roll UV module, the coated band individually (cut) and the cells were sealed.

EXAMPLE 5a

Characterization of a Full Cell (Transmission and Colorimetry)

A cell produced according to Example 4a shows the characteristic transmission spectrum in the UV/Vis spectrometer (see FIG. 14). In the colored (="unswitched") state at 0 V, only the MLCT band of the Fe-MEPE at 595 nm and the MMCT band of PB at 712 nm is visible in the spectrum. By applying a voltage of 1.6 V the cell is driven into its bright state (="switched"). The present example still shows a residual absorption in the red spectral range, which is due to the MMCT band of the PB. A full cell having a charge density of 3.0 mC/cm$^2$ for both the Fe-MEPE and for the PB electrode reaches visual transmission values of 22% and 74% in the dark or bright state (according to DIN E410).

EXAMPLE 5b

Characterization of a Full Cell (Cyclic Voltammetry)

A full cell prepared according to Example 4a shows the characteristic cyclic voltammogram (CV) shown in FIG. 15. At a scan rate (SR) (=feed rate of the potential) of 10 mV/s, the cell forms a broad oxidation and reduction wave, respectively. The anodic peak potential is around 1.2 V, the cathodic peak potential around 0.7 V. In the first cycles, at the latest by cycle 25, the cell undergoes a forming process (solid line), then the cell switches fully reversible (dashed line).

What is claimed is:
1. Electrochromic element, comprising
   a first and a second substrate, wherein each of the first and second substrates is transparent for visible light and has an electrically conductive surface on its side facing inwardly toward the electrochromic cell,
   a layered operating electrode which is in contact with the electrically conductive surface of a first of the two substrates and has a metal complex compound which is capable of entering into a redox reaction, where the transition from the oxidized to the reduced state is attended by an increase of color, and the transition from the reduced to the oxidized state is attended by a corresponding weakening of color,
   an electrolyte layer which is located between the operating electrode and the other substrate and contains movable metal cations,
   a counterelectrode located between the electrolyte material and the conductive coating of the other substrate, which is capable of intercalating mobile cations of the electrolyte material and/or of entering into a redox reaction, where the material of the second electrode is not subjected to an increase of color depth in the wavelength region of the increase of color depth of the metal complex compound during the transition from the reduced to the oxidized state,
   wherein the electrolyte layer is a transparent, flexible film that is produced using at least the following components:
   (a) a crosslinkable hybrid prepolymer,
   (b) a crosslinkable organic monomer or prepolymer,
   (c) a non-crosslinkable thermoplastic organic polymer and
   (d) a dissociable salt whose inorganic cations can, in the presence of a charge difference between the operating electrode and the counterelectrode, move between said electrodes.

2. Electrochromic element according to claim 1, wherein the prepolymers of the electrolyte layer are present in crosslinked form.

3. Electrochromic element according to claim 1, wherein the crosslinkable hybrid prepolymer (a) is an organic silicic acid(hetero)polycondensate and/or wherein the crosslinkable organic monomer or prepolymer (b) is an organic compound which is capable of undergoing a polymerization reaction, in particular a C=C addition polymerization, and/or wherein the non-crosslinkable, thermoplastic polymer (c) is selected from the group consisting of polyacrylates, acrylate ester polymers and polyethers as well as copolymers containing (poly)acrylate, an acrylate ester polymer and/or a polyether.

4. Electrochromic element according to claim 3, wherein the crosslinkable hybrid prepolymer (a) has groups, which are bonded to silicon via carbon, with organically crosslinkable or organically crosslinked residues, in particular (meth)acrylic groups, norbornenyl groups or epoxy groups, and/or wherein the crosslinkable organic monomer or prepolymer (b) contains at least one group per molecule that has one or more C=C double bonds, in particular vinyl-, acrylate-, methacrylate groups, or at least one epoxy group and/or wherein the non-crosslinkable, thermoplastic polymer (c) is selected from the group consisting of poly(methyl methacrylates), ethyl methacrylate-methyl acrylate copolymers and optionally acrylate- functional poly(propylene oxide-ethylene oxide)-copolymers.

5. Electrochromic element according to claim 1, wherein the electrolyte layer further comprises:
   (e) a solvent or a solvent mixture and/or
   (f) nanoparticles.

6. Electrochromic element according to claim 5, wherein the solvent has a boiling point greater than about 130° C., preferably greater than about 160° C. and more preferably greater than about 200° C., or wherein one component of the solvent mixture contains a solvent having such a boiling point.

7. Electrochromic element according to claim 5, wherein the surface of the nanoparticles is unmodified or modified and the material of the nanoparticles is selected from the group consisting of metal oxides, mixed metal oxides and mixtures of metal (mixed) oxides.

8. Electrochromic element according to claim 5, wherein the material of the nanoparticles is selected from the group consisting of $SiO_2$, $TiO_2$, $Al_2O_3$, $ZnO$, $ZrO_2$, and $Ta_2O_5$, and mixtures thereof and/or wherein the primary particle size of the nanoparticles is below 100 nm, preferably below 20 nm.

9. Electrochromic element according to claim 1, wherein the metal complex compound of the operating electrode has at least one chelating complexing ligand which can bind metal atoms via two or more nitrogen-, oxygen- or sulfur atoms, with at least some of the two or more nitrogen-, oxygen-, or sulfur atoms of the complexing ligand having free electron pairs.

10. Electrochromic element according to claim 9, wherein the at least one chelating complexing ligand contains at least one aromatic hetero ring selected from the group consisting of bis(benzimidazolyl)pyridine that is unsubstituted or substituted with OH or with halogen, bis(benzoxazolyl)pyridine that is unsubstituted or substituted with OH, alkoxy, nitro or, halogen, terpyridine that is unsubstituted or substituted with halogen, alkyl, alkoxy, OH, nitro, or aminophenyl, and ligands that contain two terpyridine residues bound together via a single bond or via a divalent spacer, in particular via a hydrocarbon-containing residue, that are unsubstituted or substituted with halogen, alkyl or aminophenyl.

11. Electrochromic element according to claim 10, comprising an operating electrode having
a) a combination of at least two Fe-MEPE with different ligand structures, or
b) a combination of at least one Fe-MEPE with a different MEPE having the same ligand structure, but containing a different cation, preferably a Ru-MEPE, or
c) a combination of one Fe-MEPE with a different MEPE having a different ligand structure and containing a different cation, preferably a Ru-MEPE.

12. Electrochromic element according to claim 11, wherein the different MEPEs are arranged as a mixture in one layer or separately in two overlying layers.

13. Electrochromic element according to claim 9, wherein the metal atoms of the chelating complexing ligands are selected from the group consisting of Cr, Mn, Fe, Co, Ni, Cu, Mo, Ru, Rh, Pd or a mixture thereof, in particular from iron ions.

14. Electrochromic element according to claim 9, wherein the operating electrode further contains an embedding material having hydroxy groups and non-aromatic, organic polymerizable C=C double bonds that functions as a matrix for the chelating complexing ligands.

15. Electrochromic element according to claim 14, wherein the embedding material is composed of at least 70 wt. % of an organic material and/or of a silicic acid(hetero)polycondensate relative to the embedding material.

16. Electrochromic element according to claim 15, wherein the embedding material
either
(i) comprises units which are selected from the group consisting of
(a) organic compounds in which each molecule carries at least one hydroxy group and at least one organically polymerizable C=C double bond,
and/or
(b) residues of an organically modified silicic acid (hetero)polycondensate bonded to silicon atoms by carbon, wherein each of these residues carries at least one hydroxy group and at least one organically polymerizable C=C double bond,
and/or
(ii) comprises a mixture of at least two different units, wherein a first unit is substituted with at least one hydroxy group and a second unit carries at least one organically polymerizable C=C double bond, with the proviso that these units are either residues of an organically modified silicic acid(hetero)polycondensate and/or are organic compounds and/or are different (monomer) units of polymeric organic compounds that are bonded to silicon atoms by carbon.

17. Electrochromic element according to claim 14, wherein the embedding material contains acrylic- and/or methacrylic groups, selected from the group consisting of acrylate-, methacrylate-, thioacrylate-, thiomethacrylate-, acrylamide- and methacrylamide groups.

18. Electrochromic element according to claim 14, wherein a molar ratio of the complexing compound to embedding material is from 10:1 to 1:40, preferably from 1:1 to 1:40 and more preferably from approximately 1.5:1 to 1:4.

19. Electrochromic element according to claim 9, further comprising a polar solvent, selected from the group consisting of water, an alcohol, a mixture of water and at least one alcohol, and a mixture of two alcohols, wherein the solvent can optionally contain a high-boiling solvent having a boiling point of above 100 ° C.

20. Electrochromic element according to claim 1, wherein the substrates having an electrically conductive surface are identical, have a thickness of between 75 μm and 175 μm and consist of a highly conductive plastic film whose inwardly facing surface is provided with a TCO layer, a layer stack comprising insulator/metal/insulator, an optionally over- or under-coated metal mesh, an electrically conductive polymer layer or mixed forms thereof.

21. Electrochromic element according to claim 1, wherein the first substrate with an electrically conductive surface is a flexible plastic substrate that is electrically conductive on its inner side and the second substrate is a rigid glass substrate that is electrically conductive on its inner side.

22. Use of an electrochromic element according to claim 1 as a component of a vehicle glazing, in particular of an automotive glazing, or of a helmet visor.

23. Use according to claim 22, wherein the automotive glazing is a glazing in the vehicle interior, in particular a glazing of partitions, decorative surfaces or functional surfaces, or is a glazing that separates a vehicle interior from the outer environment of the vehicle, in particular a window or door glazing.

24. Use according to claim 22, wherein the vehicle glazing comprises the following components in the indicated order: glass/adhesive film/substrate film with conductive layer/operating electrode/electrolyte/counterelectrode/substrate film with conductive layer/adhesive film/glass.

25. Use according to claim 22, wherein the vehicle glazing comprises the following components in the indicated order: glass substrate with conductive layer/operating electrode or counterelectrode/electrolyte/counterelectrode or operating electrode/substrate film with conductive layer/adhesive film/glass.

26. Vehicle glazing or helmet visor, comprising an electrochromic element according to claim 1.

27. Vehicle glazing according to claim 26, wherein the vehicle glazing is an automotive glazing, selected from a glazing in the vehicle interior, in particular a glazing of partitions, decorative surfaces or functional surfaces, or is an automotive glazing that separates a vehicle interior from the outer environment of the vehicle, in particular a window or door glazing.

28. Vehicle glazing according to claim 26, wherein the electrochromic element comprises identical substrates with electrically conductive surfaces with a thickness from between 75 μm and 175 μm and that consist of a highly conductive plastic film whose inwardly facing surface is provided with a layer of a transparent conductive metal oxide, a layer stack of insulator/metal/insulator, an optionally over- or under-coated metal mesh, an electrically conductive polymer layer or mixed forms thereof, wherein the vehicle glazing comprises the following components in the indicated order:

glass/adhesive film/substrate film with conductive layer/operating electrode/electrolyte/counterelectrode/substrate film with conductive layer/adhesive film/glass.

29. Vehicle glazing according to claim 26, wherein the first substrate of the electrochromic element with an electrically conductive surface is a flexible plastic substrate that is electrically conductive on its inner side and the second substrate of the electrochromic element is a rigid glass substrate that is electrically conductive on its inner side, wherein the vehicle glazing comprises the following components in the indicated order:

glass substrate with conductive layer/operating electrode or counterelectrode/electrolyte/counterelectrode or operating electrode/substrate film with conductive layer/adhesive film/glass.

30. Vehicle comprising a vehicle glazing according to claim 26.

31. Method for producing an electrochromic element according to claim 1, comprising:
(a) providing a first transparent substrate having an electrically conductive surface and depositing a layer of the material of the operating electrode from the liquid phase by a wet-chemical approach, preferably continuously and/or by slot die coating, onto the electrically conductive surface of the substrate such that an edge region of the electrically conductive surface remains free,
(b) providing a second transparent substrate, and depositing a layer of the material of the counterelectrode from the liquid phase, preferably via a galvanic process, onto the electrically conductive surface of the substrate such that an edge region of the electrically conductive surface remains free,
(c) cutting the substrates coated with the electrodes to the desired size,
(d) wet chemical deposition of the electrolyte mixture from the liquid phase onto one of the electrodes, preferably continuously and/or by slot die coating, thermal or photochemical crosslinking of the electrode material, wherein said step can take place before or after (e), or wet chemical deposition of the electrolyte mixture from the liquid phase onto a support substrate, thermal or photochemical crosslinking of the electrolyte material, and removal of the thereby formed self-supporting layer of the electrolyte material from the support substrate,
(e) coating or laminating the coated substrates with the electrolyte layer such that the electrode layer is positioned between the two electrodes, wherein the substrates are either arranged offset to each other such that areas that have remained free of electrode material are arranged complementary to one another, or that the coated substrates are arranged congruently to one another, and
(f) attaching conductor tracks to such edge regions of the two substrates which do not carry a layer of the material of the operating electrode, and tightly sealing the lateral edge regions of the electrochromic element by means of a sealing material such that the conductor tracks can be contacted outside of the sealing, wherein when the substrates are present in a congruent arrangement to one another, the sealing material is an electrically insulating material and is arranged such that it separates the conductor tracks of the two substrates from one another.

32. Method according to claim 31, further comprising the integration of the electrochromic element into a laminated glass, wherein
either both substrates consist of a flexible plastic material and the electrochromic element is arranged between two glass panes or two light-transmissive, flexible or non-flexible plastic panels by means of two adhesive films or adhesive material,
or one of the two substrates is a glass pane and the other of the two substrates consists of a flexible plastic material and a glass pane is attached to the substrate of flexible plastic material with the aid of an adhesive film or adhesive material.

* * * * *